(12) United States Patent
Simionescu et al.

(10) Patent No.: US 9,274,713 B2
(45) Date of Patent: Mar. 1, 2016

(54) DEVICE DRIVER, METHOD AND COMPUTER-READABLE MEDIUM FOR DYNAMICALLY CONFIGURING A STORAGE CONTROLLER BASED ON RAID TYPE, DATA ALIGNMENT WITH A CHARACTERISTIC OF STORAGE ELEMENTS AND QUEUE DEPTH IN A CACHE

(71) Applicant: LSI Corporation, San Jose, CA (US)

(72) Inventors: Horia Simionescu, Foster City, CA (US); Siddhartha Kumar Panda, Bangalore (IN); Kunal Sablok, Banagalore (IN); Kapil Sundrani, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 68 days.

(21) Appl. No.: 14/272,651

(22) Filed: May 8, 2014

(65) Prior Publication Data
US 2015/0286438 A1   Oct. 8, 2015

Related U.S. Application Data

(60) Provisional application No. 61/974,493, filed on Apr. 3, 2014.

(51) Int. Cl.
*G06F 13/00* (2006.01)
*G06F 3/06* (2006.01)
(Continued)

(52) U.S. Cl.
CPC ............ *G06F 3/0619* (2013.01); *G06F 3/0647* (2013.01); *G06F 3/0685* (2013.01); *G06F 3/0689* (2013.01); *G06F 11/2089* (2013.01);
(Continued)

(58) Field of Classification Search
CPC ............ G06F 12/0866; G06F 11/2089; G06F 12/0815; G06F 3/0647; G06F 3/0689; G06F 3/0619; G06F 3/0685
USPC ........... 711/113, 114, 103, 141, 142, 143, 144
See application file for complete search history.

(56) References Cited

U.S. PATENT DOCUMENTS

| | | | |
|---|---|---|---|
| 5,860,091 A | 1/1999 | DeKoning et al. | |
| 6,195,727 B1 * | 2/2001 | Islam | G06F 11/1076 711/114 |

(Continued)

OTHER PUBLICATIONS

LSI MegaRAID FastPath Software—An IO Accelerator for Solid State Drive Arrays, Product Brief, Apr. 2010, available at http://www.lsi.com/downloads/Public/Solid%20State%20Storage/Solid%20State%20Storage%20Common%20Files/MR_FastPath_PB_083110.pdf.

*Primary Examiner* — Hong Kim

(57) ABSTRACT

A storage controller coupled to a host computer is dynamically configured by a device driver executing in the host computer. The storage controller manages a logical volume for the host using a set of flash-based storage devices arranged as a redundant array of inexpensive disks (RAID). The device driver identifies a RAID type for the logical volume and a queue depth from a stream of I/O commands. For a logical volume in RAID 0, the device driver compares the queue depth to a threshold value and configures the storage controller to process the stream of I/O commands with a first path or an alternative path based on a result of the comparison. For a logical volume in RAID 5, the device driver performs a similar comparison and uses the result to direct the storage controller to use a write back or a write through mode of operation.

20 Claims, 13 Drawing Sheets

(51) Int. Cl.
  *G06F 11/20* (2006.01)
  *G06F 12/08* (2006.01)
(52) U.S. Cl.
  CPC ......... *G06F 12/0815* (2013.01); *G06F 12/0866* (2013.01)

(56) References Cited

U.S. PATENT DOCUMENTS

| | | | |
|---|---|---|---|
| 6,629,211 B2 | 9/2003 | McKnight et al. | |
| 6,760,807 B2 | 7/2004 | Brant et al. | |
| 6,922,754 B2 | 7/2005 | Liu et al. | |
| 6,983,396 B2 * | 1/2006 | Brant | G06F 12/0866 710/314 |
| 2002/0133735 A1 * | 9/2002 | McKean | G06F 11/2092 714/5.11 |
| 2003/0097524 A1 * | 5/2003 | Brant | G06F 3/0601 711/114 |
| 2010/0199036 A1 * | 8/2010 | Siewert | G06F 3/0613 711/112 |
| 2012/0297133 A1 * | 11/2012 | Sundrani | G06F 11/1076 711/113 |

* cited by examiner

300

|  | LOW QUEUE DEPTH | HIGH QUEUE DEPTH |
|---|---|---|
| R0 | NON FAST PATH | FAST PATH |
| R5 | WRITE BACK | WRITE THROUGH |
| SEQUENTIAL R0 | NON FAST PATH | NON FAST PATH |
| SEQUENTIAL R5 | WRITE BACK | WRITE BACK |
| I/Os NOT IN BUCKET | NON FP/WB | FAST PATH |
| UNALIGNED FOR R0 | NON FAST PATH | NON FAST PATH |

I/O ROUTING DECISION

400

| I/O SIZE | ABSOLUTE | ALIGNMENT | THRESHOLD |
|---|---|---|---|
| 4 kB | 0 / 1 | 0 / 1 | 16 |
| 8 kB | 0 / 1 | 0 / 1 | 2 |
| 16 kB | 0 / 1 | 0 / 1 | 8 |
| 32 kB | 0 / 1 | 0 / 1 | 64 |
| 64 kB | 0 / 1 | 0 / 1 | 128 |

I/O SIZE AND THRESHOLDS
FOR RAID 0

1300

| DDR SPEED (MT/S) | WRITES (MBPS) | READS (MBPS) | WR + RD (MBPS) | THEOR. MAX. (MBPS) |
|---|---|---|---|---|
| 800 | 5152.53 | 5766.48 | 4996.98 | 6400 |
|  | 80.51% | 90.10% | 78.08% |  |
| 1067 | 7840.22 | 8351.87 | 6450.45 | 8536 |
|  | 91.85% | 97.84% | 75.57% |  |
| 1333 | 9802.10 | 10437.14 | 7769.65 | 10664 |
|  | 91.92% | 97.87% | 72.86% |  |
| 1600 | 10212.20 | 10568.53 | 9159.28 | 12800 |
|  | 79.78% | 82.57% | 71.56% |  |
| 1867 | 11770.65 | 10568.53 | 9157.95 | 14928 |
|  | 78.85% | 70.80% | 61.34% |  |

DDR efficiency with respect to frequency and I/O pattern

```
typedef struct _CACHE_BYPASS_STREAM {
                               1410
    uint    countCmdsAnalyzed;    // IOs analyzed for detecting a sequential stream
                               1420
    uint    countNonSeqCmds;      // Count of non-seq. IOs while in a seq. stream
                               1430
    uint64  lastWriteLBA;         // tracks last LBA written

}   CACHE_BYPASS_STREAM
```

| I/O SIZE | No Bypass | Bypass | % Change |
|---|---|---|---|
| 512B | 322 | 323 | 0.32 |
| 2K | 1256 | 1287 | 2.49 |
| 4K | 2281 | 2362 | 3.56 |
| 8K | 3698 | 3760 | 1.67 |
| 16K | 4259 | 4355 | 2.25 |
| 32K | 4247 | 4257 | 0.25 |
| 64K | 4269 | 6164 | 43.84 |
| 128K | 4244 | 6353 | 49.71 |
| 256K | 4246 | 6236 | 46.86 |
| 512K | 4250 | 6237 | 46.76 |
| 1M | 4250 | 6239 | 46.82 |

Cache Bypass Results

DEVICE DRIVER, METHOD AND COMPUTER-READABLE MEDIUM FOR DYNAMICALLY CONFIGURING A STORAGE CONTROLLER BASED ON RAID TYPE, DATA ALIGNMENT WITH A CHARACTERISTIC OF STORAGE ELEMENTS AND QUEUE DEPTH IN A CACHE

TECHNICAL FIELD

The invention relates generally to data storage systems and, more specifically, to an adaptive data driver for interacting with data storage systems.

BACKGROUND

Data storage subsystems continue to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures is automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID).

For example, in the conventional system illustrated in FIG. 1, a RAID controller 10 controls a storage array 12 in a manner that enables such recovery. A host system 14 (e.g., a server or computer) stores data in and retrieves data from storage array 12 via RAID controller 10. That is, a processor 16, operating in accordance with an application program 18, issues requests for writing data to and reading data from storage array 12. Although for purposes of clarity host system 14 and RAID controller 10 are depicted in FIG. 1 as separate elements, it is common for a RAID controller 10 to be physically embodied as a card that plugs into a motherboard or backplane of such a host system 14.

It is known to incorporate data caching in a RAID protected storage system. In the storage system illustrated in FIG. 1, RAID controller 10 includes a RAID processing system 20 that caches data in units of blocks, which can be referred to as read cache blocks (RCBs) and write cache blocks (WCBs). The WCBs comprise data that host system 14 sends to RAID controller 10 as part of requests to store the data in storage array 12. In response to such a write request from host system 14, RAID controller 10 caches or temporarily stores a WCB in one or more cache memory modules 21, then returns an acknowledgement message to host system 14. At some later point in time, RAID controller 10 transfers the cached WCB (typically along with other previously cached WCBs) to storage array 12. The RCBs comprise data that RAID controller 10 has frequently read from storage array 12 in response to read requests from host system 14. Caching frequently requested data is more efficient than reading the same data from storage array 12 each time host system 14 requests it, since cache memory modules 21 are of a type of memory, such as flash or Dual Data Rate (DDR) memory, that can be accessed much faster than the type of memory (e.g., disk drive) that data storage array 12 comprises.

Various RAID schemes are known. The various RAID schemes are commonly referred to by a "level" number, such as "RAID-0," "RAID-1," "RAID-2," etc. As illustrated in FIG. 1, storage array 12 in a conventional RAID-5 system can include, for example, four storage devices 24, 26, 28 and 30 (e.g., arrays of disk drives). In accordance with the RAID-5 scheme, data blocks, which can be either RCBs or WCBs, are distributed across storage devices 24, 26, 28 and 30. Distributing logically sequential data blocks across multiple storage devices is known as striping. Parity information for the data blocks distributed among storage devices 24, 26, 28 and 30 in the form of a stripe is stored along with that data as part of the same stripe. For example, RAID controller 10 can distribute or stripe logically sequential data blocks A, B and C across corresponding storage areas in storage devices 24, 26 and 28, respectively, and then compute parity information for data blocks A, B and C and store the resulting parity information P_ABC in another corresponding storage area in storage device 30.

A processor 32 in RAID processing system 20 is responsible for computing the parity information. Processing system 20 includes some amount of fast local memory 34, such as double data rate synchronous dynamic random access memory (DDR SDRAM) that processor 32 utilizes when performing the parity computation. To compute the parity in the foregoing example, processor 32 reads data blocks A, B and C from storage devices 24, 26 and 28, respectively, into local memory 34 and then performs an exclusive disjunction operation, commonly referred to as an Exclusive-Or (XOR), on data blocks A, B and C in local memory 34. Processor 32 then stores the computed parity P_ABC in data storage device 30 in the same stripe in which data blocks A, B and C are stored in data storage devices 24, 26 and 28, respectively. The above-described movement of cached data and computed parity information is indicated in a general manner in broken line in FIG. 1.

The RAID-5 scheme employs parity rotation, which means that RAID controller 10 does not store the parity information for each stripe on the same one of data storage devices 24, 26, 28 and 30 as the parity information for all other stripes. For example, as shown in FIG. 1, parity information P_DEF for data blocks D, E and F is stored on storage device 28, while data blocks D, E and F are stored in the same stripe as parity information P_DEF but on storage devices 24, 26 and 30, respectively. Similarly, parity information P_GHJ for data blocks G, H and J is stored on storage device 26, while data blocks G, H and J are stored in the same stripe as parity information P_GHJ but on storage devices 24, 28 and 30, respectively. Likewise, parity information P_KLM for data blocks K, L and M is stored on storage device 24, while data blocks K, L and M are stored in the same stripe as parity information P_KLM but on storage devices 26, 28 and 30, respectively.

The described parity calculation and storage of the parity block requires time and resources to complete. A cache enabled storage controller provides maximum throughput from the host to the storage controller when a write-back cache policy is implemented. When such a write-back methodology is used, a host computer write operation is processed by temporarily storing the data associated with the write request to the cache. Once the information is saved in the cache, the storage controller reports to the host computer that the write operation is complete. Consequently, from the perspective of the host computer, the write operation is complete.

Future requests for the information located in the cache are supported by reading the information and forwarding the same to the host computer.

Thereafter, the storage controller will locate, arrange and flush the information from the cache to the data storage devices supporting the RAID protected storage volume. The storage controller may perform these operations to minimize overhead and hard disk drive write head movement.

There are multiple "levels" or types of standard geometries generally recognized for storage systems that use RAID. In RAID level 0, data blocks are stored in order across one or more storage devices without redundancy. That is, none of the data blocks are copies of another data block and there is no parity block to recover from a disk failure. In a RAID level 1 system, one or more disks are used for storing data and an equal number of additional "mirror" disks for storing copies of the information are written to the data disks. Other RAID levels, identified as RAID level 2, 3, 4 segment the data into bits, bytes, or blocks for storage across several data disks. One or more additional disks are utilized to store error correction or parity information. A single unit of storage is spread across the several disk drives and is commonly referred to as a "stripe." The stripe consists of the related data written in each of the disk drives containing data plus the parity (error recovery) information written to the parity disk drive. In RAID level 5, as described, the data is segmented into blocks for storage across several disks with a single parity block for each stripe distributed in a pre-determined configuration across each of the several disks. In RAID level 6, dual parity blocks are calculated for a stripe and are distributed across each of the several disks in the array in a pre-determined configuration. In RAID level 10 or 1+0, data blocks are mirrored and striped. In RAID level 01 or 0+1, data blocks are striped and the stripes are mirrored.

RAID storage subsystems typically utilize a control module that shields the user or host system from the details of managing the redundant array. The controller or control module makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

In RAID level 5 subsystems (as well as other RAID levels) there is a penalty in performance paid when less than an entire stripe is written to the storage array. If a portion of a stripe is written to the RAID subsystem, portions of the same stripe may need to be read so that a new parity block may be computed and re-written to the parity disk of the array. In particular, the old data stored in the portion of the stripe which is to be overwritten as well as the old parity block associated therewith needs to be read from the storage subsystem so that the new parity block values may be determined therefrom. This process is often referred to as a read-modify-write cycle due to the need to read old data from the stripe, modify the intended data blocks and associated parity data, and write the new data blocks and new parity block back to the storage array. This performance penalty is avoided if the entire stripe is written. When an entire stripe is written (often referred to as a stripe write or full-stripe write), the old data and old parity stored in the stripe to be overwritten are ignored. The new stripe data is written and a new parity block determined therefrom is written without need to reference the old data or old parity. A stripe write therefore avoids the performance penalty of read-modify-write cycles.

U.S. Pat. No. 6,760,807 to Brant et al. discloses a data storage system and method that applies an adaptive write policy for handling host write commands to write-back system drives in a dual active controller environment. The data storage system includes a host computer, a primary controller and an alternate controller. The primary and alternate controllers are coupled to one or more disk storage devices. When a write command is communicated from the host, the primary controller determines if the data encompasses an entire RAID stripe, and if so, parity data is calculated for the stripe and the data and parity data are written to the disk storage devices. Otherwise, the write data is stored in a cache and processed in accordance with a write-back policy.

U.S. Pat. No. 6,629,211 to McKnight et al. discloses a system and method for improving RAID controller performance through adaptive write back or write through caching. The system includes a host computer system and a RAID subsystem. The RAID subsystem includes a cache supported controller and a plurality of disk drives. The method uses the cache in write back mode when the RAID controller is lightly loaded and uses cache in write through mode when the RAID controller is heavily loaded. In the write back mode, the data is written to the cache prior to storing data to at least one disk drive of the plurality of disk drives. In the write through mode, the data is written directly to the one or more disk drives without going through the cache buffer.

U.S. Pat. No. 6,922,754 to Liu et al. discloses a data flow manager and a method for determining what data should be cached and what data should be sent directly to a data store. The decision to cache data or to send the data directly to the data store is determined based on the type of data requested, the state of the cache, the state of I/O components, or system policies. In one aspect, the data flow manager tries to predict data access patterns. In another aspect, the data flow manager attempts to group writes together. In still another aspect, the data flow manager receives an input responsive to the content contained in a data access. In this aspect, the data flow manager is a content aware data flow manager.

Conventional data storage controllers configured to operate in a write back or data caching mode send the data associated with write operations to a relatively fast memory (e.g. a dynamic random access memory or DRAM). When configured to operate in a write through mode, the data storage controllers forward all write operations to the backend or long term storage devices. Each mode has respective performance advantages under some workloads and performance disadvantages for some other workloads. In general, the write back mode can provide relatively short latency when the storage controller is lightly loaded. However, as the workload increases, so does the overhead associated with managing cached data. Thus, when the storage controller is heavily loaded, it is desirable to avoid the additional overhead that results from caching write data. Consequently, a write through mode is more appropriate for heavy workloads.

However, in a multi-workload environment a single cache policy or switching policy for a storage volume may not provide a desired performance for each workload.

SUMMARY

Embodiments of systems and methods for improving the performance of write operations from a host computer to a data store managed by a data storage controller supported by both volatile and non-volatile storage elements are illustrated and described in exemplary embodiments.

A data storage controller coupled to a host computer is dynamically configured by a device driver executing in the host computer. The data storage controller manages a logical volume for the host using a set of flash-based storage devices arranged as a redundant array of inexpensive disks (RAID). The device driver identifies a RAID type for the logical volume and a queue depth from a stream of I/O commands. For a logical volume supported by storage devices arranged in RAID 0, the device driver compares the queue depth and under some circumstances data characteristics in the I/O commands to respective thresholds and configures the data storage controller to process the stream of I/O commands with a first path or an alternative path in the data storage controller based on a result of the comparison(s). For a logical volume supported by storage devices arranged in RAID 5, the device driver performs similar comparisons and uses the results to direct the data storage controller to use a write back or a write through mode of operation based on the result.

In an exemplary embodiment, a method for dynamic switching of write-back to write-through caching mode in a data storage controller managing a logical volume supported by flash-based storage devices exposed to a host as a redundant array of inexpensive disks (RAID) is disclosed. The method includes the steps of identifying a RAID type for a logical volume managed by a data storage controller, identifying a characteristic of a set of flash-based storage devices coupled to the data storage controller, initializing a device driver with an alignment flag and a threshold type, monitoring a stream of write commands to determine a queue depth, whether the target addresses are sequential, and when the alignment flag is set whether the data to be written is in alignment based on the characteristic of the set of flash-based storage elements, for a logical volume supported by RAID type 0, using the queue depth to direct the storage controller to use one of a first data path or an alternative data path different from the first data path in the data storage controller and for a logical volume supported by RAID type 5, using queue depth to direct the storage controller to use a write back mode or a write through mode.

An example system includes a host computer, a host bus adapter, and a set of flash-based data storage devices. The host computer functions in accordance with logic enabled by an operating system and at least one user application. The operating system is arranged to identify a logical volume to the at least one user application. The logical volume is configured by the device driver. The host bus adapter is coupled to the host computer. The host bus adapter includes a data storage controller supported by a cache. The set of flash-based data storage devices are exposed to the host computer as a single or logical data volume and are managed by the data storage controller as a redundant array of inexpensive disks. The device driver dynamically configures the data storage controller to use one of a first data path that avoids the cache or a second or alternate data path different from the first data path that includes the cache when the flash-based data storage elements supporting the logical volume are arranged in RAID type 0. When the flash-based data storage elements supporting the logical volume are arranged in RAID type 5, the device driver configures the data storage controller to operate in one of a write-back mode or a write-through mode. The device driver identifies the RAID type for the logical volume, identifies a characteristic of the set of flash-based storage devices, receive an alignment flag and a threshold type (for example from firmware in the host computer), and monitors a stream of write commands issued by the host computer to determine a queue depth, whether the target addresses are sequential, and when the alignment flag is set, whether the data to be written is in alignment based on the characteristic of the set of flash-based storage elements.

In another exemplary embodiment, a computer-readable medium includes stored instructions in a non-transitory form that, when executed on a processing system of a host computer, direct the host computer to: identify a RAID type for a logical volume managed by a data storage controller coupled to the host computer, identify a characteristic of a set of flash-based storage devices coupled to the data storage controller, initialize a device driver with an alignment flag and a threshold type, monitor a stream of write commands to determine a queue depth, whether the target addresses are sequential, and when the alignment flag is set whether the data to be written is in alignment based on the characteristic of the set of flash-based storage elements, such that for a logical volume supported by RAID type 0, the host computer uses the queue depth to direct the data storage controller to use one of a first data path or an alternative data path different from the first data path in the data storage controller and such that for a logical volume supported by RAID type 5, the host computer uses the queue depth to direct the data storage controller to use one of a write back mode or a write through mode.

BRIEF DESCRIPTION OF THE FIGURES

The systems and methods for improving the performance of write operations from a host computer to a data store managed by a data storage controller can be better understood with reference to the following drawings. The components in the drawings are not necessarily to scale, emphasis instead being placed upon clearly illustrating the principles of operation. Moreover, in the drawings, like reference numerals designate corresponding parts throughout the several views.

FIG. 13 is a table of efficiency of an example DDR memory operating at different frequencies and with different I/O patterns.

FIG. 14 is a schematic illustration of an embodiment of cache bypass logic.

WRITTEN DESCRIPTION OF ILLUSTRATIVE EMBODIMENTS

Figure 1:
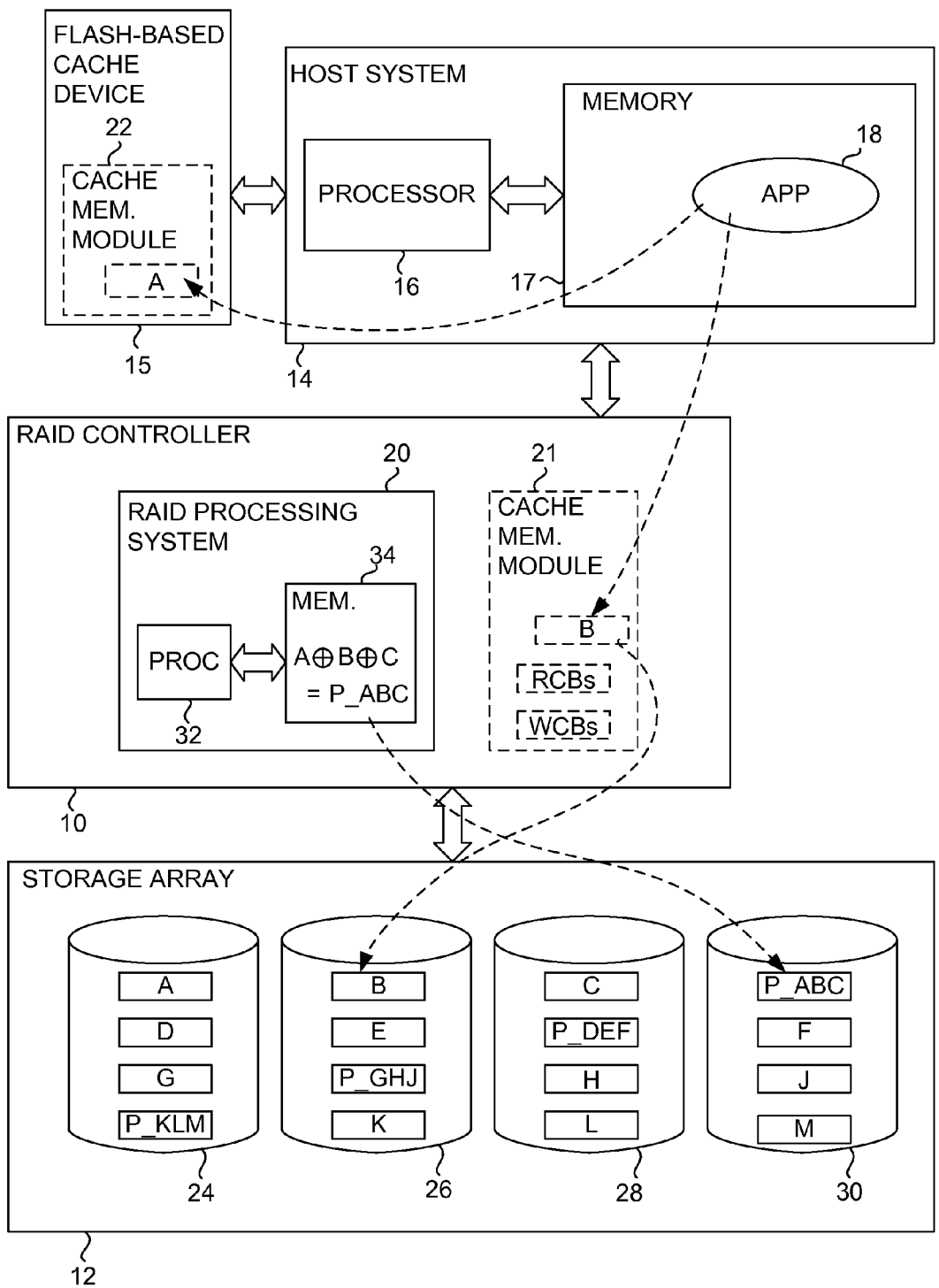
FIG. 1 is a schematic diagram illustrating an embodiment of a conventional data storage system.

In a multi-workload environment a single cache policy or switching policy for a storage volume does not provide desired performance for each workload. Moreover, a cache policy suitable for a data volume supported by storage devices arranged in a first RAID level may not be suitable for a data volume supported by storage devices arranged in a second RAID level different from the first RAID level.

The present data storage device driver and methods for dynamically configuring a data storage controller are well suited for a host bus adapter based data storage controller that includes a RAID-on-chip (ROC) with a dual-core architecture. In an example embodiment, a ROC is arranged with a fast-path core or circuits arranged to forward data directly from an I/O port coupled to a host bus to one or more I/O ports coupled to a set of flash-based data storage elements or devices. The fast-path core is part of a first data path provided by the ROC. The ROC is further configured with a cache processing core or circuits arranged to perform the complex processing associated with managing a local cache memory. The cache processing core is part of a second or alternative data path provided by the ROC. In some arrangements, the ROC may include a switch responsive to local logic or a signal communicated from a host computer or other remote source for determining which of the first path or the alternative path should be used to process I/O commands.

Based on one or more characteristics associated with the type of flash-based storage elements present in a set of storage devices coupled to the host bus adapter, a RAID type, I/O queue depth, and in some cases I/O sizes, a data storage driver determines when it is proper to change the mode of operation to optimize the performance of write commands issued from the host computer to the data storage controller. The device driver operates in response to various thresholds, which may be uploaded or otherwise communicated to the device driver during firmware or driver initialization.

At any point in time while the device driver is executing on the host computer, the driver monitors the I/O queue depth, sequential behavior, alignment (with respect to one or more characteristics of the flash-based storage elements) and based on the various thresholds directs the storage controller to operate in one of a write through mode or a write back mode. Various characteristics of the I/O commands issued by the host computer to the storage controller or ROC are monitored by a device driver in the host computer. These characteristics are compared against the communicated thresholds to dynamically adjust the storage controller. For example, when an I/O command is determined to be a sequential write, the driver will direct the storage controller to operate in a write back mode.

For different write command sizes, the driver executes bucket logic. A bucket is assigned for a defined range of I/O sizes. For each bucket, the driver reads a queue depth value from firmware. The queue depth and I/O size are used to determine when to switch from the second or alternative path to the first data path.

For unaligned write command data, the first data path is not optimal as the flash storage processor would have to perform a read modified write. Consequently, for unaligned write commands, the driver marks the same for processing in the second or alternative path where the data will be cached in the data storage controller.

It has also been determined that write performance in write back mode is limited by the efficiency of the cache storage element when the cache storage is a dual-data rate (DDR) RAM element. For sequential write operations data is forwarded through an I/O cache or is processed by a cache path in the storage controller until a number of active sequential streams meets or exceeds a specified queue depth.

To avoid such performance bottlenecks, the storage controller firmware and/or a data storage driver are modified to detect sequential command streams for a data volume. The storage controller firmware and/or data storage driver will permit a desired level of host I/O command re-ordering at the operating system level by allowing a desired number of non-sequential commands to be inserted between sequential commands. The improved algorithm accounts for relatively small data blocks and relatively low queue depth requests where the host I/O commands are better processed in the controller cache to improve overall throughput and latency. The bypass mode of operation is only applied for RAID 0 and RAID 1 writes because RAID 5 and RAID 6 require DDR buffers for parity calculations.

The improved algorithm checks the I/O size against a defined write bypass threshold as relatively small I/O sizes are best placed in the DDR. The improved algorithm detects a sequential stream of I/O commands and will check for a minimum number of sequential I/O commands before the algorithm will direct the storage controller to bypass the cache. To account for low queue depths (in which case data should be placed in the DDR), the cumulative size of active writes on a given data volume must be larger than the size of a single stripe across the data storage elements supporting the volume. In addition, no portion of the I/O request should be dirty in DDR. A threshold number of non-sequential requests are permitted before directing the storage controller to break or change from a cache bypass mode. Furthermore, if any portion of the I/O request is valid in cache, firmware will mark the cache as invalid and continue in the cache bypass mode. Moreover, when any portion of the I/O request is dirty in the cache, the improved algorithm will break the sequential stream and will not bypass the cache.

A data structure for analyzing a stream of I/O commands includes a count of commands analyzed, a count of non-sequential commands and a logical block address for the last write operation. A write bypass threshold size is set to K bytes, where K is an integer. A second threshold defines a minimum number of commands to initiate a cache bypass. A third threshold defines a minimum number of non-sequential commands to terminate a cache bypass. A flow diagram illustrating an embodiment of the improved cache bypass algorithm is illustrated and described in association with FIG. 15.

Various embodiments of systems, components and methods for improving the performance of write operations from a host computer to a data store managed by a data storage controller supported by both volatile and non-volatile storage elements are illustrated and described in exemplary embodiments.

Attention is now directed to the illustrated embodiments of the improved storage system, computer-readable medium, and methods for processing data transfers using a storage controller to manage data transfers between a host computer or host system and a primary data store as shown in FIGS. 2-17.

Figure 2:
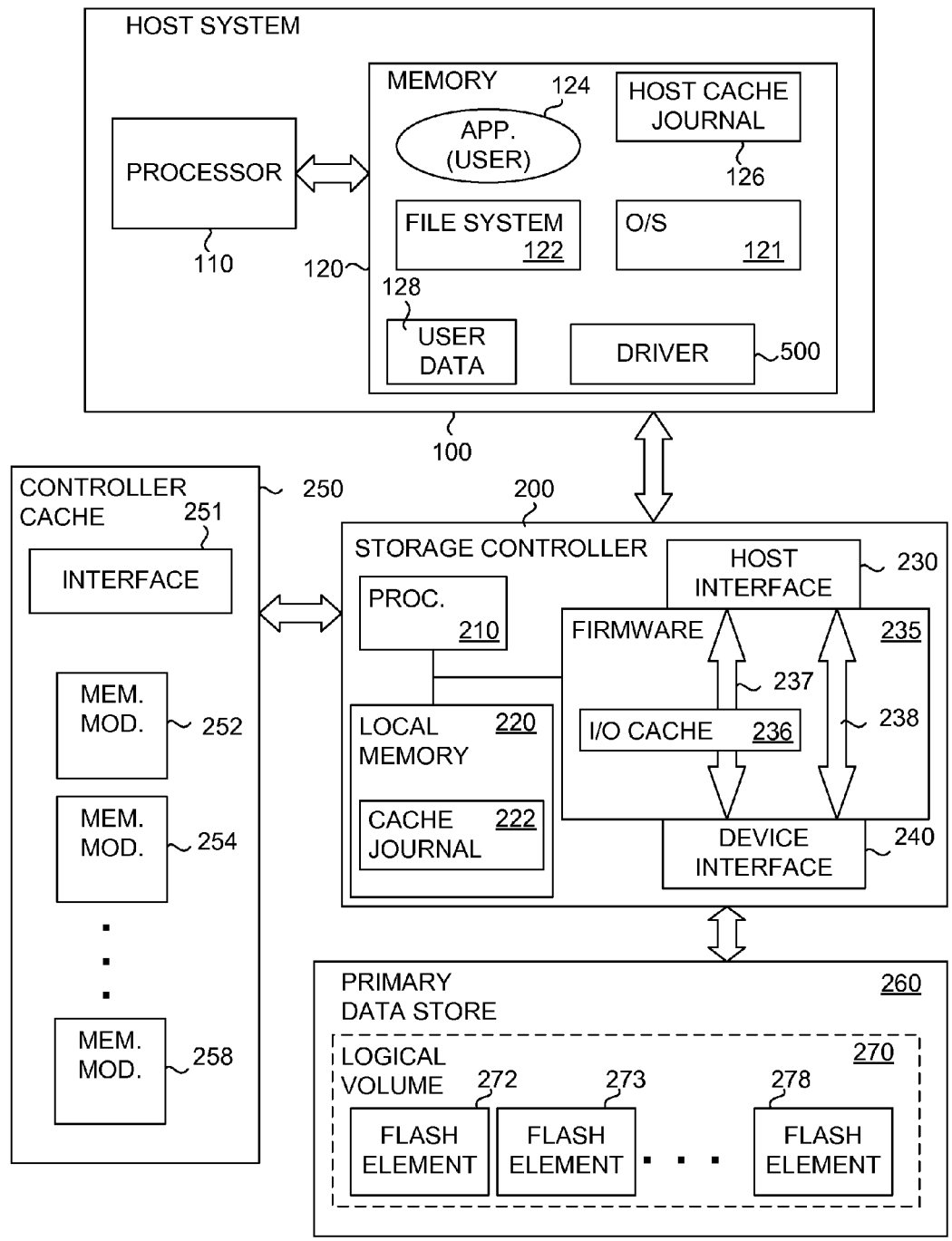
FIG. 2 is a block diagram illustrating an embodiment of an improved data storage system.

FIG. 2 includes a block diagram that illustrates an embodiment of an improved data storage system. The improved data storage system includes a host computer or host system 100, a storage controller 200, a cache 250 and a primary data store 260. Host system 100 communicates with the storage controller 200 which in turn stores data in primary data store 260. The cache 250 and/or the I/O cache 236 are used by the storage controller 200 to reduce the time or latency for retrieving data from the primary data store 260. In preferred embodiments, the contents of the cache 250 or the I/O cache 236 are not exposed to the application level programs executing in the host system 100. In these preferred embodiments, the storage controller 200 alone is responsible for managing the cache 250 or the I/O cache 236.

The host system 100 includes at least one processor 110 in communication with a memory element 120 via a communication bus represented by a two-way arrow. The memory 120 includes an operating system 121, which manages a file system 122 and that also includes application software and associated data represented in the illustration as APP. 124. One or more of APP(s) 124 and/or the file system 122, under the direction of the operating system 121, communicate with the storage controller 200 to store files, programs, user data 128 or other information in an organized way in the primary data store 260. A modified device driver or driver 500 enables and manages the transfer of data between the host system 100 and the storage controller 200. The memory 120 further includes a host cache journal 126 that is maintained by the driver 500 to enable one or more of the APP(s) 124 to interface with the storage controller 200 and to recover from power loss situations. As described, the host cache journal 126 manages data for all registered entities and functions as a generic interface for any low-level device driver operative on the host system 100.

From the perspective of the host system 100, data stored in the primary data store 260 appears as one or more logical data volumes 270 even though the data may be distributed across a set of solid-state or flash-based data storage devices. Stated another way, the host system 100 is aware of one or more logically separated storage locations or letter labeled drives.

Host system 100 is a computing device such as a server or other computer that functions in accordance with one or more operating system(s) (O/S) 121 and is capable of executing one or more applications, such as APP 124. Host system 100 further includes the modified device driver or driver 500, which connects the APP 124 and the O/S 121 to the data volume(s) in the primary data store 260. The host system 100 may include one or more additional interfaces such as human-to-machine interfaces (not shown) to support configuration and interaction with an operator.

The storage controller 200 includes one or more processors such as the processor 210, a memory element 220, host interface 230 and device interface 240. The processor 210 and the memory element 220 communicate via a bus illustrated with a two-way arrow. The memory 220 or the firmware 235 includes an I/O cache 236 for recording I/O operations or data transfers between the primary data store 260 and the host system 100. One or more of the processor 210 and the memory 220 may further include cache logic (not shown) for managing data transfers between the host system 100 and the primary data store 260 or the controller cache 250. The cache journal 222 separately records transactions between the storage controller 200 and the cache 250. Thus, the host system 100 and the storage controller 200 maintain respective cache journals.

Host interface 230 receives commands and data from the driver 500 in the host system 100 and performs any necessary translations before forwarding the same to the firmware 235, which includes a first processing path 237 that interfaces with the I/O cache 236 and a second processing path 238 that avoids the I/O cache. The driver 500 and the host interface 230 communicate with each other using the PCIe communication protocol.

The processor 210 is a hardware device for executing firmware and or software stored in the memory 220, which can be supported by a read-only memory element. The processor 210 can be constructed in accordance with a custom made or a commercially available integrated-circuit based processor, or can even be a standalone central processing unit (CPU); an auxiliary processor among several processors associated with PCIe compliant device; a semiconductor-based microprocessor (in the form of a microchip or chip set); or generally any device for executing software instructions stored in the memory 220. The processor 210 under the control of the driver 500 enables data transfers between the cache 250 and the storage controller 200. An interface 251 in the cache 250 buffers or translates information signals from the storage controller 200 before forwarding the same to the I/O interfaces of the memory modules 252-258. The data transfers as managed by the storage controller 200 include cache write operations to designated memory modules 252 through 258, which may be implemented with DDR memory modules or solid-state storage devices. The data transfers further include cache flush operations that include information that is written to the primary data store 260 by way of the device interface 240.

Although for purposes of clarity host system 100 and the storage controller 200 are depicted in FIG. 2 as separate elements, it is common for storage controllers to be physically embodied as an integrated circuit card that plugs into a motherboard or backplane (not shown) of such a host system 100.

Accordingly, the storage controller 200 is provided for identifying or acting in response to the identification of "hot" or frequently accessed data that is already stored in the primary data store 260. The storage controller 200 acting in response to such an indication, will store a copy of the hot data in the cache 250 and/or the I/O cache 236 so that future requests for the information from the host system 100 can be fulfilled much more quickly by the combination of the cache 250 and the storage controller 200 than by the combination of the storage controller 200 and the primary data store 260.

The cache 250 includes an interface 251 and a set of N memory modules, where N is an integer. In the illustrated embodiment, each of the N memory modules 252-258 includes or is supported by a dedicated I/O interface for transferring data to and from the integrated circuit elements therein that provide the addressable circuit locations for storing information. For embodiments that are expected to store only data that has been previously stored in the primary store 260, N may be as small as one. For embodiments that are expected to store data that is being stored in the controller cache 250 until a later time when the data can be written to the primary store 260, N may be as small as three or as large as desired. In these situations, one of the N memory modules may be used to store parity information.

Figure 3:
FIG. 3 is a table illustrating an embodiment of write command routing decisions based on RAID type, and various characteristics of write commands.

FIG. 3 is a table illustrating an embodiment of write command routing decisions based on RAID type, and various characteristics of write commands. As indicated in table 300, I/O routing decisions are made in accordance with a low queue depth or a high queue depth. Queue depth is a measure of the workload as a function of the number of stripes or rows of data are presently buffered in the storage controller 200 that are designated for a write operation to a logical volume 270 distributed across flash storage elements 272-278 in the primary data store 260. A low queue depth threshold value is provided in a startup configuration that is stored in firmware or in a memory that is used to initialize the storage controller 200. A present measure of queue depth in the storage controller 200 is compared against the low queue depth threshold value. When the present measure of queue depth is below the low queue depth threshold the storage controller 200 is lightly loaded. Under these light load conditions, when the logical volume 270 is supported by flash elements 272-278 arranged in a RAID 0 configuration, a non-fast path for transferring data to be written to the logical volume 270 is preferred. Under these same light load conditions, when the logical volume 270 is supported by flash elements 272-278 arranged in a RAID 5 configuration, a write back mode is preferred. These same preferences are applied when the write commands buffered in the storage controller 200 on the way to the primary data store 260 are determined to be sequential in nature. Still considering light workloads, when the I/O operations are not in a threshold bucket, it is preferred to operate in a non-fast path or write back mode (i.e., where data is temporarily cached in or under management of the storage controller 200. As indicated in the last row, for I/O operations that include data that is unaligned with the flash storage elements 272-278, it is preferred to process data in a non-fast path through the storage controller 200.

Similarly, a high queue depth threshold value is provided in a startup configuration that is stored in firmware or in a memory that is used to initialize the storage controller 200. A present measure of queue depth in the storage controller 200 is compared against the high queue depth threshold value. When the present measure of queue depth is equal to or above the high queue depth threshold, the storage controller 200 is significantly loaded. Under these "heavy" load conditions, when the logical volume 270 is supported by flash elements 272-278 arranged in a RAID 0 configuration, a fast path for transferring data to be written to the logical volume 270 is preferred. Under these same heavy load conditions, when the logical volume 270 is supported by flash elements 272-278 arranged in a RAID 5 configuration, a write through mode is preferred. When a series of I/O commands is determined to be sequential and the storage elements are arranged in a RAID 0 configuration, the storage controller 200 is directed to use a non-fast path for transferring data to the primary data store 260. Under heavy load conditions and data storage elements arranged in a RAID 5 configuration, it is preferred to operate the storage controller 200 in a write back or cached data mode. When the I/O operations are not in a threshold bucket, it is preferred to operate in a fast path for transferring data to be written to the logical volume 270. As indicated in the last row, for I/O operations that include data that is unaligned with the flash storage elements 272-278, it is preferred to process data in a non-fast path through the storage controller 200.

Figure 4:
FIG. 4 is a table illustrating an embodiment of example thresholds for various write command sequence lengths for a data volume supported with storage devices arranged in RAID 0.

FIG. 4 is a table 400 illustrating an embodiment of thresholds for various write command sequence lengths for a data volume supported with storage devices arranged in RAID 0. Threshold values, wherever and however stored, are provided to the device driver or driver 500. As briefly explained, the device driver 500 directs or redirects the I/O operations based on I/O size and the communicated threshold values. A first parameter that is communicated to the driver is labeled "absolute" in the table 400. When set or indicated the absolute flag or parameter directs the device driver 500 to apply an exact match for the I/O size. Otherwise, when the absolute flag or parameter is not set, the device driver 500 the threshold is applied as a range. That is, 0 to 4 kB, 4 kB+1 to 8 kB, etc. A second parameter that is communicated to the driver 500 is labeled "alignment." When set, the alignment flag directs the device driver 500 to check for the corresponding bucket for I/O alignment. When the I/O does not lie in any bucket, the I/O should be transferred or processed in non-fast path for RAID 0 storage volumes. As further indicated in table 400, the device driver 500 may be configured with threshold values for different bucket sizes.

Figure 5:
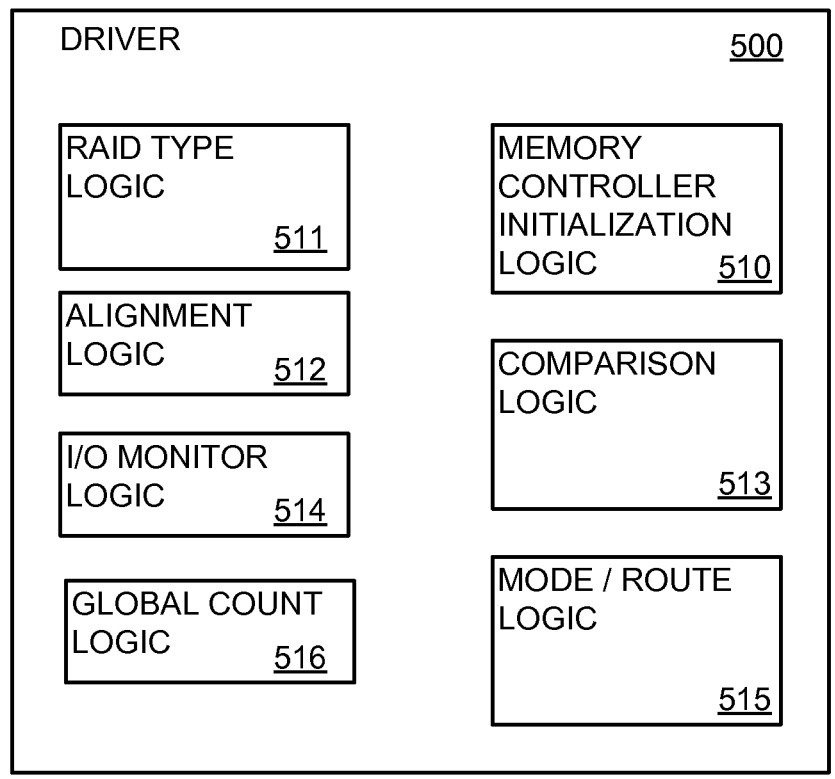
FIG. 5 is a schematic illustration of an embodiment of the improved device driver introduced in FIG. 2.

FIG. 5 is a schematic illustration of an embodiment of the driver 500 introduced in FIG. 2. The driver 500 is a computer program that operates or controls the storage controller 200. The driver 500 provides an interface that enables the O/S 121 and one or more application programs such as application 124 to access hardware function in the storage controller 200 that enable data transfers to the primary data store 260. As indicated, the driver 500 is arranged with logic elements or modules that enable associated functions when the logic is executed by the processor 110. The driver 500 includes storage controller initialization logic 510, RAID type logic 511, alignment logic 512, comparison logic 513, I/O monitor logic 514, mode/route logic 515, analysis logic 516 and global count logic 517. Although the various logic modules or elements are illustrated and described as being subparts of a single driver 500 one or more of the functions provided by the separate logic modules may be distributed across multiple drivers or instances of drivers loaded in one or more storage elements coupled to the processor 210.

It should be recognized that the illustrated logic elements or modules whether enabled in firmware, such as in the processor 110, in a read-only memory (not shown) coupled to the processor 110, or stored in the memory 120, can also be stored in a non-transitory computer-readable medium. When stored on such a medium, data values and processor instructions stored thereon may be transferred to other computing devices and/or other storage devices.

Wherever or however stored or enabled, the storage controller initialization logic 510 includes processor instructions for arranging or otherwise preparing the storage controller 200 to manage the transfer of data between the host system 100 and the primary data store 260. The RAID-type logic 511 includes processor instructions arranged to identify and/or recognize the RAID type used to distribute the stored data in the logical volume 270. The RAID-type logic 511 distinguishes between RAID 0, RAID 5 and other RAID types.

Alignment logic 512 includes processor instructions responsive to one or more characteristics of the flash elements 272-278 used to support the RAID array. For example, the one or more characteristics of the flash elements 272-278 may include a channel bandwidth or another physical characteristic. I/O data is in alignment when the I/O size of the data is an integer multiple of the bandwidth of the channel or channels that provide a communication path between the storage controller 200 and the individual flash elements 272-278.

Comparison logic 513 includes processor instructions arranged to perform any of the generally recognized comparison or relational operations (e.g., equal to, not equal to, greater than, less than, greater than or equal to, less than or equal to). In some arrangements, the comparison logic 513 is arranged to perform logical operations (e.g., AND, OR, NEGATION or NOT) and/or bitwise operations (e.g., XOR) as may be desired.

I/O monitor logic 514 includes processor instructions that when executed by the processor 210 direct the processor 110 to observe one or more characteristics of the I/O commands in a series or stream of I/O commands. For example, the I/O monitor logic 514 is arranged to determine when a series of write commands are identifying sequential target addresses in the flash memory elements 272-278 in the logical volume 270 of the data store 260. The I/O logic 514 functions together with the alignment logic 512 to observe conditions or characteristics present in the I/O command stream.

Global count logic 516 includes processor instructions that when executed by the processor 210 direct the processor 210 to collect a measure of the number of rows of write I/O data designated for storage in data volumes supported in a RAID 0 and/or RAID 5 configuration that are present in the I/O cache 236. The global count logic 516 further directs the processor 210 to collect a measure of the number of rows of I/O data that are presently buffered in the I/O cache 236 designated for other storage volumes. Once the measures have been registered the processor 210 is directed to determine the sum of the two measures and store the result in a global counter 640.

Mode/Route logic 515 includes processor instructions that when executed by the processor 210 direct the processor 210 to make operation mode and firmware routing path decisions for data that is to be buffered and transferred between the host system 100 and the data volume 270. For example, in some conditions, data is cached, while under some other conditions, the cache is bypassed entirely. As described, when the data is arranged in RAID 0 and the queue depth in the storage controller as defined by a counter is below a first threshold value, the I/O data will be transferred through a non-fast path (i.e., the cache will be used). When the data is arranged in RAID 0 and the queue depth in the storage controller 200 is above a second threshold value, the I/O data is directed to bypass the cache and use a fast path through the storage controller firmware. By way of further example, when the data is arranged in RAID 5 and the queue depth is below the first threshold value or a RAID 5 low queue depth threshold value different from the RAID 0 low queue depth threshold value, the storage controller 200 is directed to use a write back mode of operation that engages the I/O cache 236. When the data is arranged in RAID 5 and the queue depth exceeds a respective high queue depth threshold, the storage controller 200 is directed to use a write-through mode of operation that bypasses the I/O cache 236.

Figure 6:
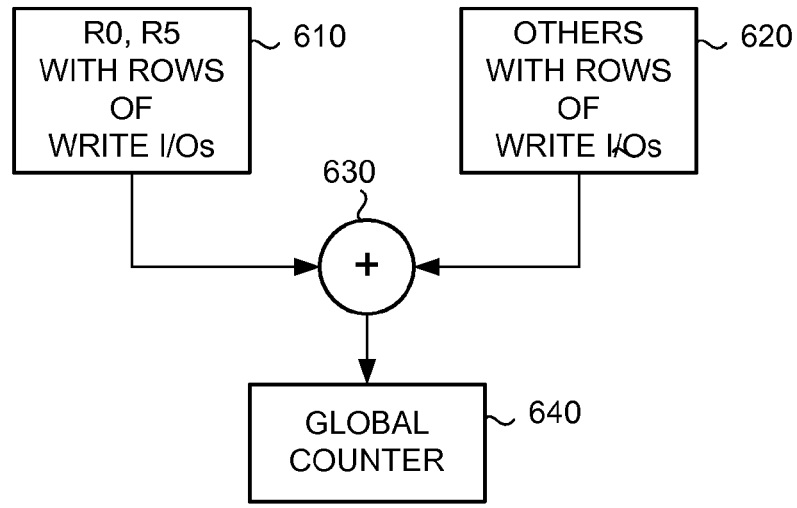
FIG. 6 is a schematic illustration of an embodiment of a global counter.

FIG. 6 is a schematic illustration of an embodiment of a global counter. In some arrangements, the storage controller 200 may be managing multiple RAID arrays or storage volumes across the set of flash storage devices 272-278 in a primary data store 260. When this is the case, a global measure of the queue depth takes into account the present workloads by logging the number of rows that are buffered in the storage controller 200 that are waiting to be permanently stored in the primary data store 260. These can include RAID 0 and RAID 5 storage volumes with a number of rows of write I/Os that remain to be written as indicated by block 610 and other storage volumes arranged in configurations other than RAID 0 and RAID 5 that have rows of write I/Os presently buffered in the storage controller 200, as indicated in block 620. As further indicated in FIG. 6, the values in each of block 610 and block 620 are communicated to the adder 630. The result as computed by the adder and/or an addition operation is stored in the global counter 640, which can be enabled in a designated register or set of registers.

Figure 7:
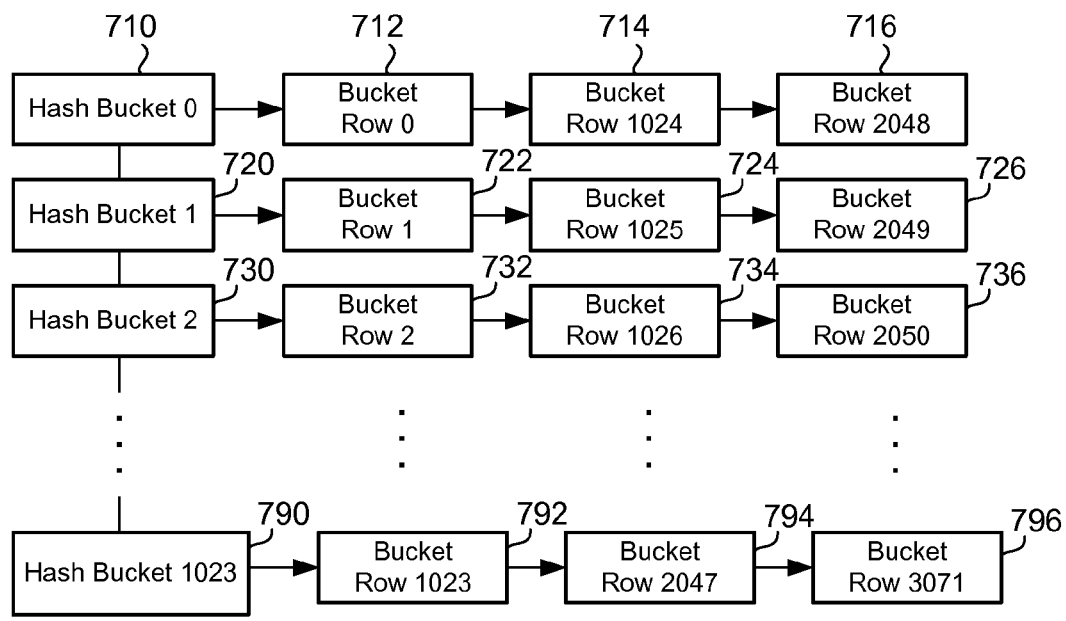
FIG. 7 is a schematic illustration of an embodiment of an arrangement of hash buckets.

FIG. 7 is a schematic illustration of an embodiment of an arrangement of hash buckets. Whether enabled in firmware in the storage controller 200 or in the driver 500 in the host system 100, threshold bucket synchronization is initiated in response to configuration change events. When the driver 500 or firmware receive an indication of a change event (e.g., a signal), the driver 500 will capture or retrieve the threshold bucket values. Example change events include one or more of a logical volume create, delete, or offline event. Additional configuration change events may include a configuration clear, a cache policy change, a host bus scan request, or other logical volume state change. Firmware will populate the threshold values based on characteristics or properties of the flash elements 272-278 supporting the logical volume 270. For non-RAID storage schemes, or RAID types other than RAID 0 and RAID 5, threshold buckets are not enabled.

FIG. 7 shows the hash bucket organization. IOs which are sequential or IOs on the same row require special handling. This logic is applicable writes when the storage array is arranged in RAID 0. In the example arrangement, there are 1024 hash buckets 710, 720, 730, . . . , 790 and 1024 hash bucket nodes or rows. In the example arrangement, the bucket 712 is associated with a first row or row 0, with a next subsequent bucket 722 associated with row 1, bucket 732 associated with row 2 and so on through hash bucket 792, which is associated with row 1023 or the $1024^{th}$ row. The arrangement repeats as further indicated in FIG. 7 with bucket 714 associated with row 1024 or the $1025^{th}$ row, a next subsequent bucket 724 associated with row 1025, bucket 734 associated with row 1026 and so on through hash bucket 794, which is associated with row 2047. Similarly, bucket 716 is associated with row 2048 or the 2049th row, a next subsequent bucket 726 associated with row 2049, bucket 736 is associated with row 2050 and so on through hash bucket 796, which is associated with row 3071.

Since the total number of IOs at any point in time is <=1024, the hash buckets and hash nodes are limited in the example embodiment to 1024. Even if the number of IOs possible is <=1024, the total number of hash buckets and hash nodes is chosen close to the power of 2 to take advantage of the relative speed of fast bitwise calculations or manipulations. It should be understood that the logic can be expanded to support an expanded number of hash buckets and hash bucket nodes to any value if firmware changes the maximum number of commands to support. IOs on the same row are sent in non-fast path mode as described. To detect if the IOs are on the same row or targeted for the same row, a mechanism is deployed to determine on which rows write IOs are outstanding or pending. The mechanism or logic is enabled for logical volumes arranged in RAID 0 for write I/Os. When an IO is received, its row number from end LBA is determined. If the I/O is intended for the same row and same logical volume, the bucket node is present in the hash buckets, then it means the corresponding IO should be processed in non-fast path mode (i.e., the data should be cached). If the bucket node is not present, then new node needs to be created and IO needs to be sent in fast-path or non-fast-path based on threshold logic implementation. For multi-row IOs, end row number is the final row number for a particular hash bucket search. The search time is constant for each hash bucket. After that a sequential search is made to see if any IO is outstanding for that same row. A local counter is maintained per hash bucket node. This counter determines the number of outstanding IOs on that row. For any write IO, hash bucket is searched based on end row of the IO. After that a sequential search with row number and a logical volume target id is made. If no hash bucket node is present, the one hash bucket node is allocated from pre-allocated list of hash bucket nodes. Its local counter is set to 1 and it is attached to a hash bucket list. If the hash bucket node is already present, its local counter gets incremented before sending the write IO to the storage controller 200.

Figure 8:
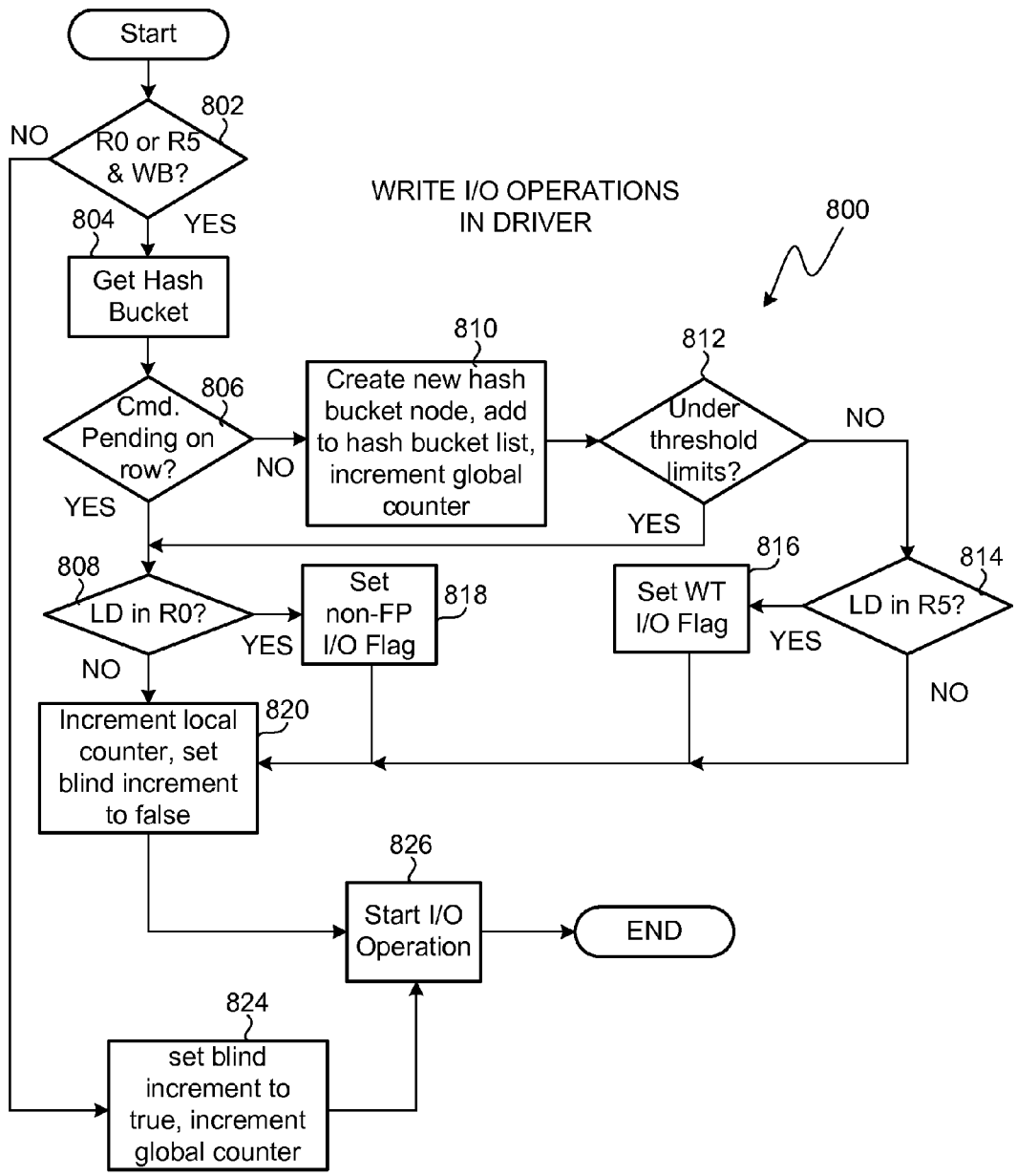
FIG. 8 is a flow diagram illustrating an embodiment of write command processing in the device driver of FIG. 5.

FIG. 8 is a flow diagram illustrating an embodiment of write command processing in the device driver of FIG. 5. That is a method 800 for performing write I/O operations under the management of a the driver 500 begins with block 802 where it is determined if the logical volume being managed by the storage controller 200 is organized in RAID 0 or RAID 5 and if the storage controller 200 is in a write-back mode of operation (i.e., the I/O cache 236 is in use). When both conditions are not met processing continues with the functions illustrated in block 824 where the set blind increment flag is set to true and the global counter is incremented. Thereafter as illustrated in block 826 the I/O operation as provided by the host computer 100 is performed by the storage controller 200.

Otherwise, when both tested conditions in block 802 are true, processing continues with block 804, where information in a hash bucket is retrieved. In decision block 806, it is determined if a command is pending on the current row of interest. When a command is not pending for the present row of interest, a new hash bucket node is created, added to the hash bucket list, and the global counter is incremented. Thereafter, in decision block 812 it is determined whether the value in the global counter falls under the low queue threshold and the high queue threshold. When the value in the global counter is under both thresholds, as indicated by the flow control arrow labeled, "Yes" exiting decision block 812 processing continues with decision block 808 where it is determined if the logical volume or logical disk is supported by data arranged in RAID 0. When this is the case as indicated by block 818 a non-FP or non-fast path flag is set. The non-fast path flag instructs the driver 500 to direct the storage controller 200 to use the I/O cache 236.

Otherwise, when the value in the global counter indicates that the storage controller 200 is operating under a relatively heavy load it is determined in decision block 814 whether the storage controller 200 is managing a logical volume or logical disk that is arranged in a RAID 5 configuration. When this is the case, processing continues with block 816, where a write-through flag is set in the driver 500. The write-through flag directs the storage controller to operate in a write-through mode of operation where the I/O cache is bypassed.

As indicated by the flow control arrows exiting decision blocks 808 and 814 when the determination in the respective blocks is negative or when the respective flags have been set in accordance with block 816 and block 818 respectively, processing continues with block 820 where a local counter is incremented and a blind increment flag is set to false. Thereafter, the I/O operation is processed as indicated in block 826.

Figure 9:
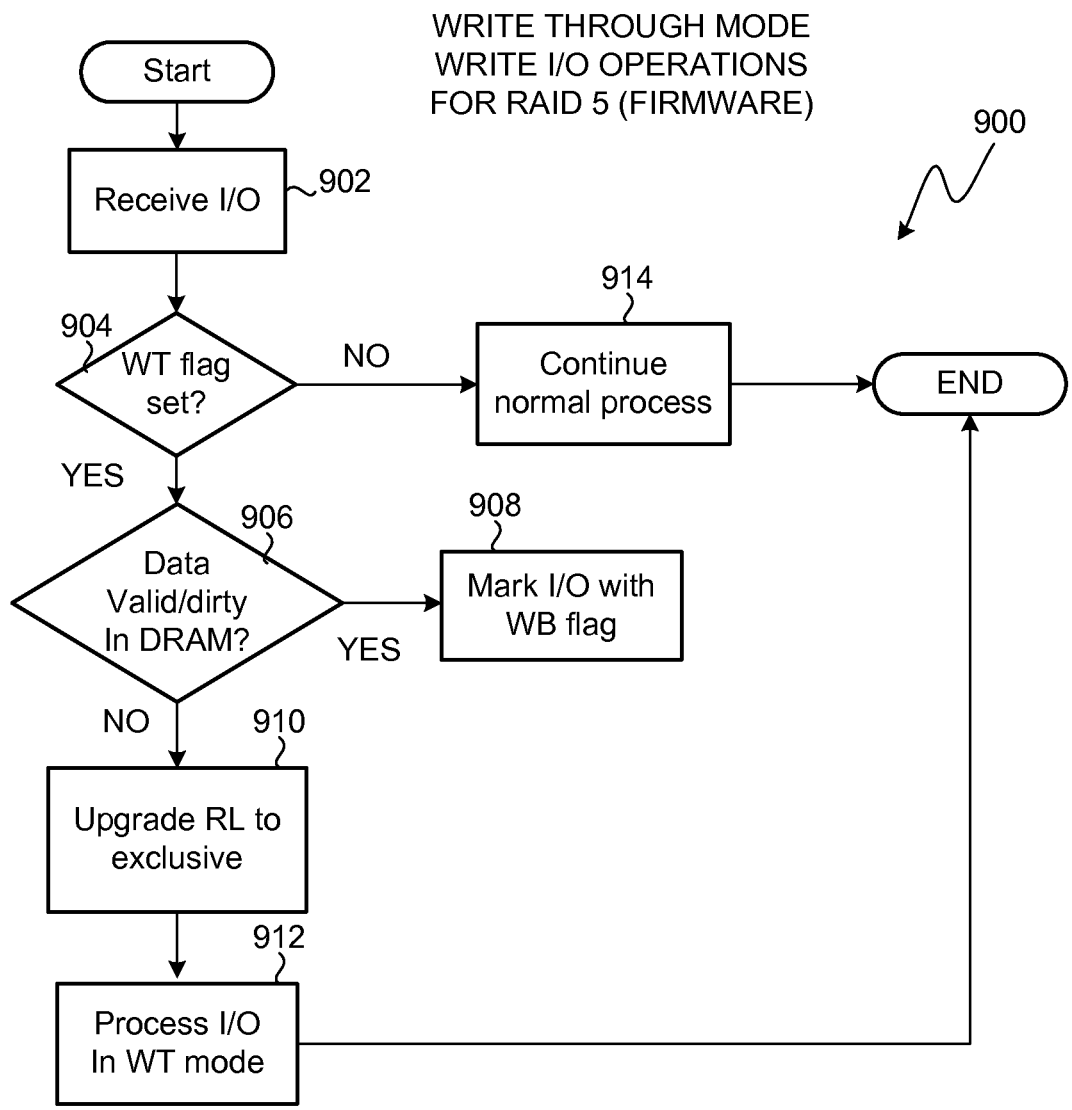
FIG. 9 is a flow diagram illustrating an embodiment of write through mode processing in the storage controller of FIG. 2.

FIG. 9 is a flow diagram illustrating an embodiment of write through mode processing in the storage controller 200 of FIG. 2. As indicated in FIG. 9, the write-through mode is appropriate when the logical volume being managed by the storage controller 200 is arranged in a RAID 5 configuration. The method 900 begins with block 902 where an I/O command or request is received. In decision block 904 a determination is made as to whether a write through flag is set in the driver 500 or in firmware of the storage controller 200. When the write-through flag is set, as indicated by the flow control arrow labeled, "Yes" exiting decision block 906, it is further determined if the data in the cache is valid and whether buffered data in a DRAM has been written to after it was stored in the flash elements 272-278 supporting the logical volume 270. When both conditions are present, the I/O is marked or tagged with a write-back flag.

Otherwise, when both conditions tested by the query in decision block 906 are not met, a region lock is upgraded to exclusive, as indicated in block 910. A region lock is a flag or mechanism used when managing data in a RAID storage volume. A command affecting a given range of sectors on a RAID volume can block processing of any other command that accesses an overlapping range of sectors. Types of region locks include EXCLUSIVE, SHARED_READ and SHARED_WRITE. A non-EXCLUSIVE (or shared) region lock blocks, and is blocked, by any overlapping non-EXCLUSIVE region locks of a different type, and by any overlapping EXCLUSIVE region locks. A non-EXCLUSIVE region lock does not block and is not blocked by other non-EXCLUSIVE region locks of the same type. An EXCLUSIVE region lock blocks all overlapping region lock requests of all types. Under certain circumstances a shared region lock may be promoted to exclusive to avoid other IO commands that could modify the data that is being written to the disk or disks or during error recovery operations. Thereafter, as indicated in block 912 the storage controller is directed to process the I/O in write-through mode (i.e., to bypass the I/O cache 236).

Figure 10:
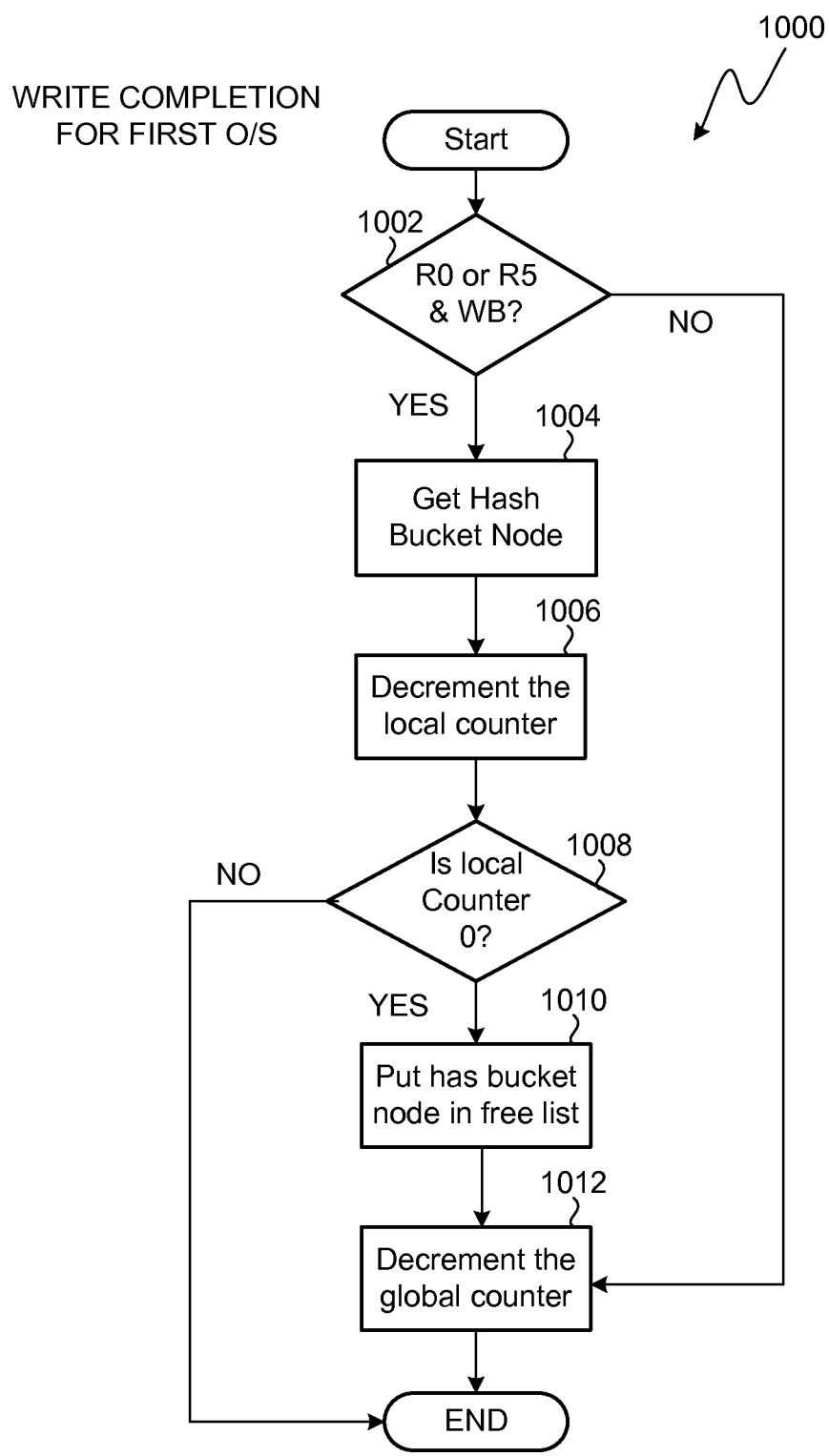
FIG. 10 is a flow diagram illustrating an embodiment of write command completion by the device driver of FIG. 5 for an example operating system.

FIG. 10 is a flow diagram illustrating an embodiment of write command completion by the driver 500 of FIG. 5 for an example operating system that manages hash buckets. The method 1000 determines when the storage controller 200 has completed a present write I/O operation when in a write-back mode. The method 1000 begins with decision block 1002 where it determined whether the logical volume being managed by a storage controller 200 is arranged in RAID 0 or RAID 5 and if the storage controller 200 is operating in a write-back mode. When one or both tested conditions are false, processing continue with block 1012 where the global counter is decremented. Otherwise, when the tested conditions are both true processing continues with block 1004 where information from a hash bucket node is retrieved. In block 1006 a local counter is decremented. When the local counter is zero, the method 1000 is terminated. Otherwise, when the local counter is not exhausted, the information in the hash bucket node retrieved in block 1004 is placed in a free list as shown in block 1010 and the global counter is decremented, as indicated in block 1012.

Figure 11:
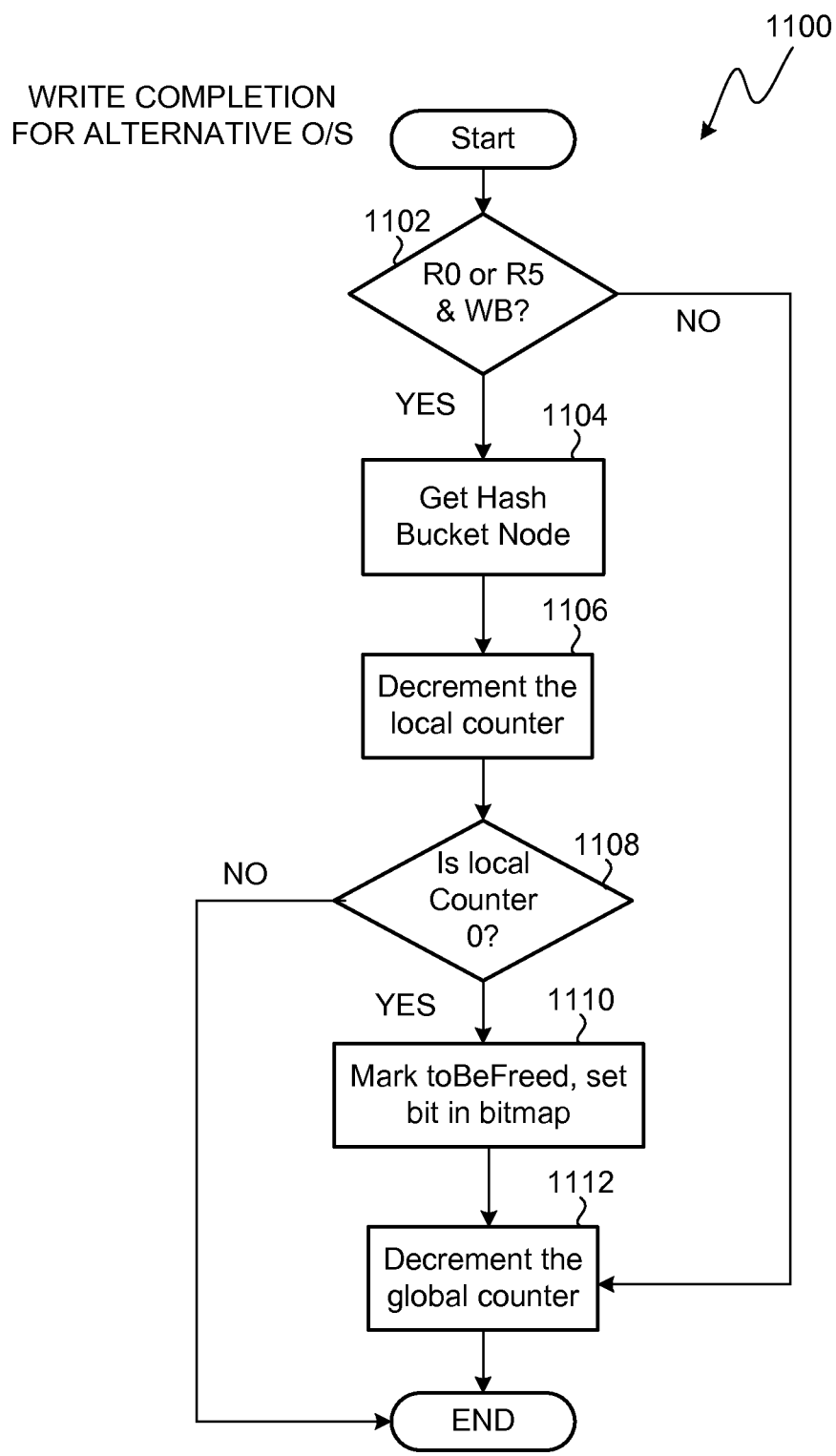
FIG. 11 is a flow diagram illustrating an embodiment of write command completion by the device driver of FIG. 5 for another example operating system.

FIG. 11 is a flow diagram illustrating an embodiment of write command completion by the device driver of FIG. 5 for another example operating system that does not manage hash buckets. The method 1100 determines when the storage controller 200 has completed a present write I/O operation when in a write-back mode. The method 1100 begins with decision block 1102 where it determined whether the logical volume being managed by a storage controller 200 is arranged in RAID 0 or RAID 5 and if the storage controller 200 is operating in a write-back mode. When one or both tested conditions are false, processing continue with block 1112 where the global counter is decremented. Otherwise, when the tested conditions are both true processing continues with block 1104 where information from a hash bucket node is retrieved. In block 1106 a local counter is decremented. When the local counter is zero as determined in decision block 1108, the method 1100 is terminated. Otherwise, when the local counter is not exhausted, the information in the hash bucket node retrieved in block 1104 is marked to be freed by the O/S 121 and a respective bit is set in a bitmap as indicated in block 1110. Thereafter, as indicated in block 1112, the global counter is decremented.

Figure 12:
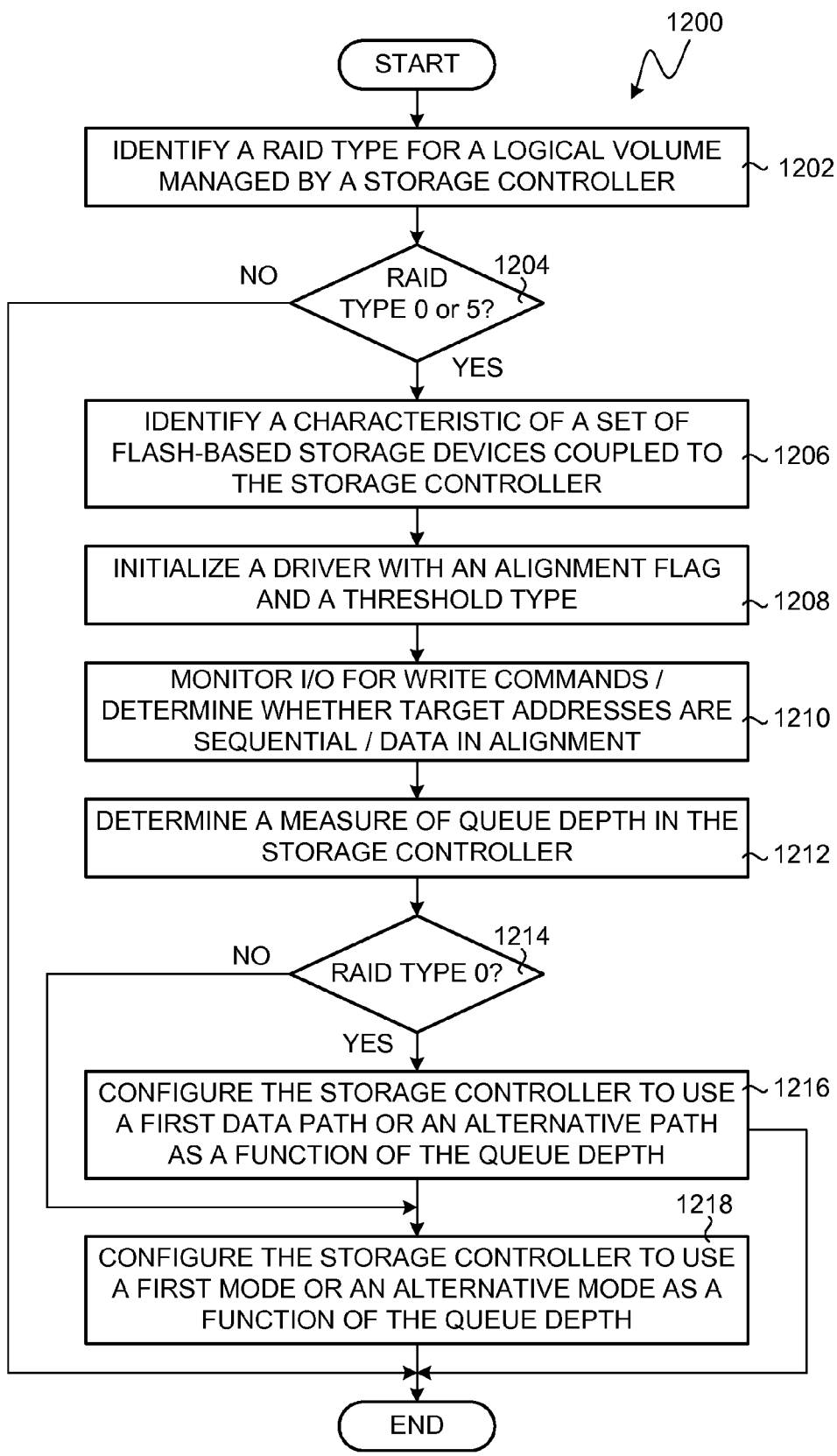
FIG. 12 is a flow diagram illustrating an embodiment of a method for dynamically configuring the storage controller of FIG. 2.

FIG. 12 is a flow diagram illustrating an embodiment of a method 1200 for dynamically configuring the storage controller 200 of FIG. 2. The method 1200 begins with block 1202 where a RAID type is identified for a logical volume 270 managed by a storage controller 200. When the storage controller 200 is managing more than one logical volume 270 a RAID type may be identified and associated with each logical volume 270. In decision block 1204 it is determined whether the RAID type identified in block 1202 indicates that the data in the logical volume 270 is organized under RAID 0 or RAID 5. When the logical volume is not organized or stored using RAID or the RAID type is other than 0 or 5 as shown by the flow control arrow labeled, "No" exiting decision block 1204, the method 1200 terminates. Otherwise, when RAID is in use and the RAID type is RAID 0 or RAID 5, processing continues with block 1206, where a characteristic of a set of flash-based storage devices, such as flash-elements 272-278, supporting the logical volume 270 is identified. In block 1208 a driver is initialized with an alignment flag or indicator and a threshold type. Thereafter, as illustrated in block 1210 an I/O stream is monitored for a series of write commands. Specifically, the I/O stream is analyzed or observed to identify when the I/O stream includes writes to sequential addresses or blocks in the logical volume 270 and whether the data in the I/O is in alignment with the one or more of the channel width or block size. In block 1212, the driver 500 determines a measure of queue depth in the storage controller 200. When the logical volume is arranged in RAID 0, the storage controller 200 is directed by the driver 500 to use a first data path or an alternative data path as a function of the queue depth in the storage controller 200. For example, as described when the measured queue depth is below a low queue depth threshold, the storage controller 200 is directed to operate using a data path that includes the I/O cache 236. By way of further example, when the measured queue depth is above or exceeds a high queue depth threshold, the storage controller 200 is directed by the driver 500 to operate in a mode that uses an alternative path that bypasses the I/O cache 236. Otherwise, when the logical volume 270 is organized in a RAID 5 configuration, processing continues with block 1218 where the storage controller is configured to operate in a write back mode under conditions where the present queue depth is below a low queue depth threshold value. Conversely, the storage controller 200 is directed to operate in a write through mode under conditions where the present queue depth exceeds a high queue depth threshold value. The functions associated with blocks 1210 through 1218 may be repeated as may be desired.

FIG. 13 includes a table 1300 of efficiency of an example double data rate (DDR) synchronous dynamic random access memory (SDRAM) designs operating at different frequencies and with different I/O patterns. DDR memory elements transfer data on both transitions of the clock signal. Thus, a DDR SDRAM operating with a 400 MHz clock signal can operate at an 800 MT/s data transfer rate, which is capable of transferring 6.4 GB/s or 6400 MB/s. The table 1300 includes a left-most column that includes five example data transfer rates and a right-most column that includes the theoretical maximum data transferred in bits per second. The theoretical maximum data transfer is not achievable because data is not sent on every clock signal transition. For example address and control signals must also be communicated to manage the data transfers. These address and control signals are typically sent only on the rising edge of the clock signal. The table 13 further includes measured data transfer rates for a sequence of write commands, read commands, and both write commands and read commands issued to the DDR SDRAM.

As is evident from the table 1300, even though the net bandwidth increases with DDR speed (or clock frequency), the effective bandwidth, determined as a percentage of the theoretical maximum data transfer rate, at the corresponding speed falls off with the increase in DDR efficiency. While the measured data transfer rates are implementation dependent, the general relationship depicted in FIG. 13 is present for known DDR implementations.

As is further evident from the table 1300, a mix of reads and writes yields an effective bandwidth of only about 61% at the highest speed of 1867 MT/s, which provides a transfer rate of about 9157 MB/s. For a write back mode workload that accesses DDR twice for every I/O operation, the effective yield would be around 4500 MB/s (assuming no impact from firmware overhead). With the PCIe 3.0 standard providing 8 MT/s for 8 data lanes and latest generation of SAS interfaces providing 9600 MB/s for 8 physical interfaces or PHYS, DDR in use on a storage controller such as the storage controller 200 will present a performance bottleneck even after adjusting data rates for overhead in the respective interfaces.

Since bandwidth is a function of I/O size, a storage controller is directed to bypass DDR and transfer data directly from PCI to SAS when presented with a stream of large sequential writes. A cache bypass data structure and a method for selectively bypassing a cache is presented in association with FIG. 14 and FIG. 15, respectively. The method bypasses a cache when firmware detects a sequential stream of large writes on storage volumes operating in a write-back mode and bypasses DDR to DMA data directly from PCI to SAS.

FIG. 14 shows a cache bypass data structure 1400 that includes three variables for maintaining information that can be used by the storage controller 200 when making a determination to bypass a cache coupled to the storage controller 200. A first command 1410 labeled, "countCmdsAnalyzed" initializes a variable to hold or store a count of the commands that have been analyzed in a stream of I/O commands. A second command 1420 labeled, "countNonSeqCmds" initializes a variable to hold or store a count of the number of non-sequential commands present in an otherwise sequential stream of commands. A third command 1430 labeled, "lastWriteLBA" initializes a variable to hold or store an identifier associated with the last logical block address that was accessed by a write operation. These variables are used in a method or process for determining when to bypass a cache that can be enabled in the storage controller 200. An example embodiment of such a method is illustrated and described in association with the flow diagram of FIG. 15.

Figure 15:
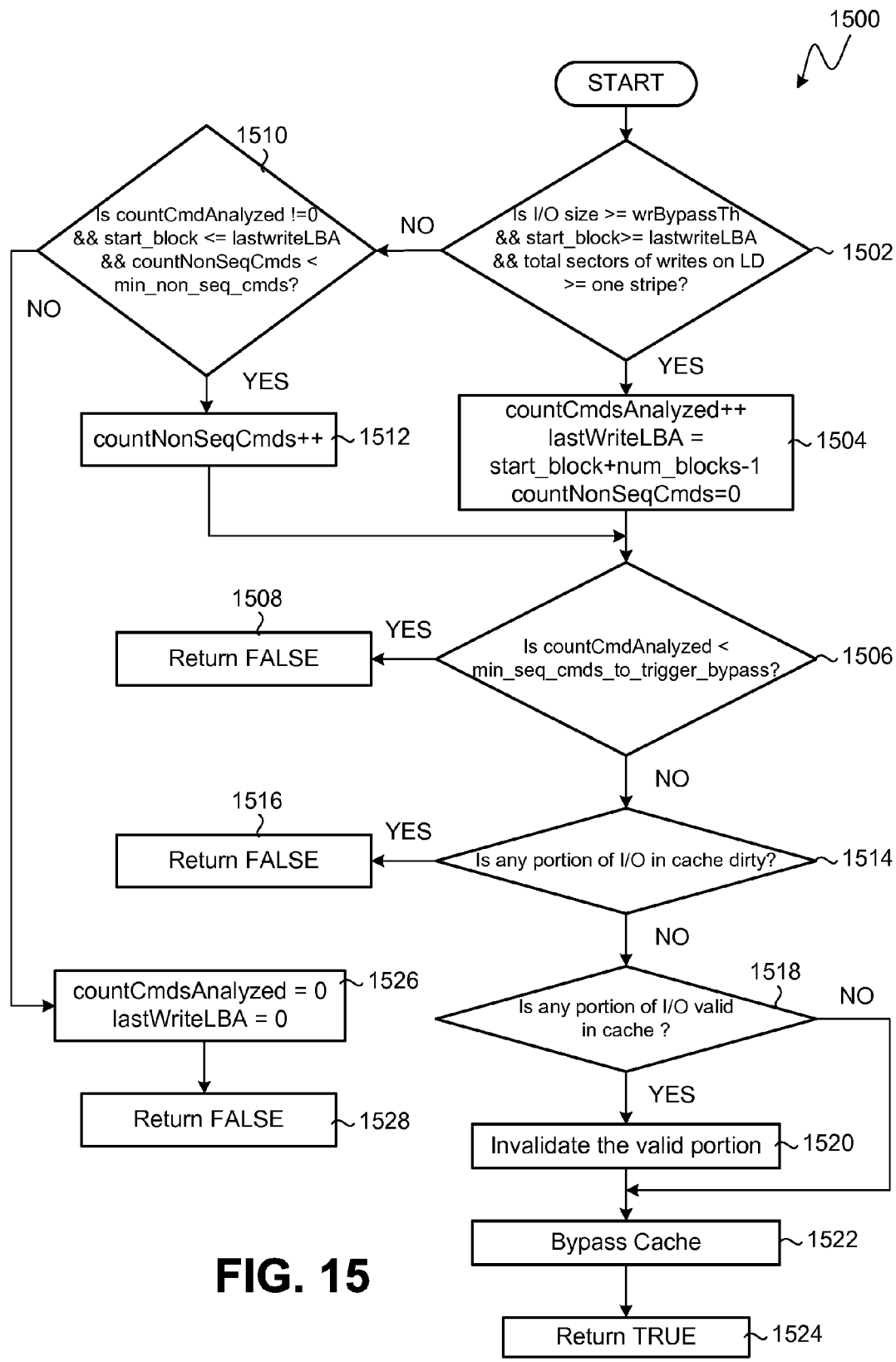
FIG. 15 is a flow diagram illustrating an embodiment of an improved cache bypass algorithm suitable for deployment in the storage controller of FIG. 2.

As indicated in FIG. 15, a method 1500 for determining appropriate conditions for bypassing a cache in the storage controller 200 of FIG. 2 begins with decision block 1502 where a present I/O size is compared with a write bypass threshold, a start block for a write to a given storage volume is compared with the last logical block address that was written on the specific volume, and sum of sectors of writes active on the logical volume is compared against the total number of sectors in a stripe for that volume. When each of the I/O size is greater than or equal to the write bypass threshold, the start block is greater than or equal to the last logical block address and the total sectors of active writes on the logical volume is greater than or equal to one stripe, processing continues with the functions illustrated in block 1504. As indicated in block 1504 the count of commands analyzed is incremented, the last logical block address is set to the sum of start block and a number of data blocks minus one and the count of non-sequential commands is reset to 0.

Otherwise, if any one of the three tested conditions illustrated in decision block 1502 is not met, processing continues with decision block 1510 where additional conditions are tested. As shown in block 1510, when the sum of commands analyzed is not equal to zero, the start block is less than or equal to the last logical block address and when the sum of non-sequential commands is less than the minimum non sequential commands threshold, processing continues with block 1512, where the count of non-sequential commands is incremented. Otherwise, when any of the three conditions tested in decision block 1510 are not met, processing continues with the block 1526, where the count of commands analyzed and the last logical block address written to are reset to 0. Thereafter, as indicated in block 1528, a false flag or indicator is set to indicate that DDR will not be bypassed.

After the functions illustrated in either block 1504 or block 1512 have been completed, processing continues with the query in decision block 1506. As illustrated, when the count of commands analyzed is determined to be less than the minimum number of sequential commands to trigger a bypass, as indicated in block 1508, a false flag or indicator is set. Otherwise, when the number of commands analyzed is equal to or greater than the minimum number of sequential commands to trigger a bypass, processing continues with the query in decision block 1514. As illustrated in block 1514 if any portion of the I/O in cache is "dirty", as indicated in block 1516, a false flag or indicator is set. Otherwise, processing continues with the query of decision block 1518. As illustrated in block 1518 if any portion of the I/O is valid in cache the cache is invalidated in block 1520 before bypassing the cache as indicated in block 1522. Otherwise, as indicated by the flow control arrow labeled, "No" exiting decision block 1518, when none of the portion of the I/O is valid in cache, processing continues with block 1522 where the cache is bypassed and a flag or indicator is set to true in block 1524.

Figures 16, 17:
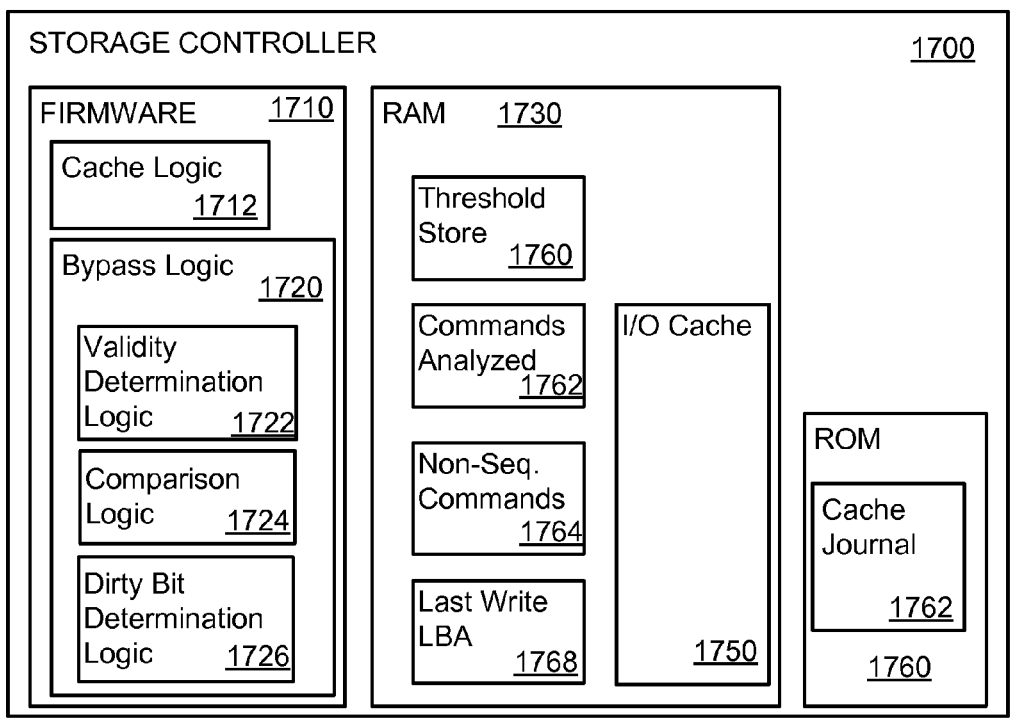
FIG. 16 is a table illustrating example performance gains when bypassing DDR for large sequential write operations in a write back mode of operation.
FIG. 17 is a schematic illustration of an embodiment of a computer-readable medium accessible to a host computer.

FIG. 16 is a table illustrating example performance gains when bypassing DDR for large sequential write operations in a write back mode of operation. As indicated in the table 1600 for I/O sizes of 32 kBytes or less there is minimal performance gain as a result of a cache bypass. However, for I/O sizes of 64 kBytes and larger, performance increases are significant and approach nearly 50% for I/O sizes of about 128 kBytes.

FIG. 17 is a schematic illustration of logic elements, modules and or data storage registers in an example embodiment of a storage controller 1700 that includes firmware 1710 and a random-access memory (RAM) 1730. It should be recognized that the illustrated logic elements or modules whether enabled in firmware 1710 or stored in the RAM 1730 can also be stored in a non-transitory computer-readable medium. When stored on such a medium, the data values and processor instructions stored thereon may be transferred to other computing devices and/or other storage devices.

As illustrated in FIG. 17, RAM 1730 is arranged with a threshold store 1760, commands analyzed store 1762, non-sequential commands store 1764, logical block address store 1768, and an I/O cache 1750. In contrast with the illustrated embodiment, which shows the I/O cache 1750 enabled in RAM, the I/O cache 1750 may be distributed across multiple storage elements such as one or more flash memory storage elements in communication with the storage controller 200. The cache journal 1740 is stored in one or more flash memory storage elements to ensure data integrity in case of a power failure or interruption. In further contrast with the illustrated embodiment, which shows commands analyzed store 1762, non-sequential commands store 1764, and logical block address store 1768 in the RAM 1730, one or more of these dedicated stores can be enabled in registers in firmware 1710 or other storage elements accessible to the storage controller 1700.

Wherever or however stored or enabled the I/O cache 1750 temporarily stores data and commands to increase I/O performance for data transfers between the host system 100 and the primary data store 260 (FIG. 2). However or wherever stored or enabled, the cache journal 1740 retains a log of transfers to and from the cache Wherever or however stored or enabled, the cache logic 1712 includes processor instructions arranged to manage the temporary storage of data, metadata including commands, requests, target volumes and addresses etc. such that future requests for the data in the cache can be accessed by the host computer faster than accessing and transferring the same information from another storage location. In this regard, the cache logic 1712 is generally arranged to direct the storage controller 200 to respond to requests from a host system 100 with data from the I/O cache 1750 when it is present and valid in the cache 1750.

Wherever or however stored or enabled, the bypass logic 1720 includes processor instructions arranged to enable a method for bypassing a cache such as for example, the method 1500 illustrated and described in association with FIG. 15. In the illustrated embodiment, the bypass logic 1720 includes validity determination logic 1722, comparison logic 1724 and dirty bit determination logic 1726. Validity determination logic 1722 determines when it is appropriate to set a bit or flag indicating that a row or other logical sub-division of the cache is loaded with valid data. Comparison logic 1724 is arranged to perform any of the generally recognized comparison or relational operations (e.g., equal to, not equal to, greater than, less than, greater than or equal to, less than or equal to). In some arrangements, the firmware 1710 is arranged to perform logical operations (e.g., AND, OR, NEGATION or NOT) and/or bitwise operations (e.g., XOR) as may be desired. Dirty bit determination logic 1726 identifies when data is unchanged since it was read from the main memory ("clean") or whether the data has been changed in the cache since it was read from the main memory and not yet stored in its changed state in the main memory ("dirty"). As described, the flags or indicators as stored in association with each data block in the cache 1750 will be used by the bypass logic 1720 when determining whether present conditions in the storage controller 200 indicate that the cache should be bypassed to increase or achieve a desired performance.

Certain steps in the example processes or process flows naturally precede others for the storage controller 200 to function as described. However, the present system, driver and methods are not limited to the order of the steps described if such order or sequence does not alter the functionality of the above-described system, driver and methods. That is, it is recognized that some steps may be performed before, after, or in parallel (substantially simultaneously) with other steps. In some instances, certain steps may be omitted or not performed without departing from the above-described systems and methods. Further, words such as "thereafter", "then", "next", "subsequently", etc. are not intended to limit the order of the steps. These words are simply used to guide the reader through the description of the exemplary method.

It should be noted that the systems and methods have been described with reference to one or more exemplary embodiments for the purpose of demonstrating principles and concepts of operation. The systems and methods are not limited to these embodiments. As will be understood by persons skilled in the art, in view of the description provided herein, many variations may be made to the embodiments described herein and all such variations are within the scope of the systems and methods as defined in the claims.

What is claimed is:

1. A method for dynamic switching of write-back to write-through caching mode in a storage controller managing a logical volume supported by flash-based storage devices exposed to a host as a redundant array of inexpensive disks (RAID), the method comprising:
   identifying a RAID type for a logical volume managed by a storage controller;
   identifying a characteristic of a set of flash-based storage devices coupled to the storage controller;
   initializing a storage controller driver with an alignment flag and a threshold type;
   monitoring a stream of write commands to determine whether target addresses identified in the stream of write commands are sequential, and when the alignment flag is set whether data identified in the stream of write commands to be written is in alignment based on the characteristic of the set of flash-based storage devices;
   determining a measure of queue depth in the storage controller;
   for a logical volume supported by RAID type 0, using the queue depth to direct the storage controller to use one of a first data path or an alternative data path different from the first data path in the data storage controller; and
   for a logical volume supported by RAID type 5, using queue depth to direct the storage controller to use a write back mode or a write through mode.

2. The method of claim 1, wherein identifying the characteristic of the set of flash-based storage devices includes identifying a data channel width.

3. The method of claim 1, wherein the threshold type is selected from the group consisting of absolute and range.

4. The method of claim 3, further comprising:
   when the threshold type is absolute, identifying when a write command data size matches a threshold data value.

5. The method of claim 3, further comprising:
   when the threshold type is range, identifying when a write command data size is between a first data value and a second data value.

6. The method of claim 1, wherein initializing the storage controller driver is responsive to a configuration change event in the storage controller.

7. The method of claim 6, wherein the configuration change event in the storage controller is selected from the group consisting of a host bus scan request, a cache policy change, a logical volume create, a logical volume delete, and a logical volume offline/online state.

8. The method of claim 1, further comprising:
   maintaining a global counter responsive to an outstanding workload for the storage controller.

9. The method of claim 8, wherein the global counter defines a number of stripes for which write commands are outstanding for RAID type 0, RAID type 5 and other logical volumes supported by the storage controller.

10. The method of claim 8, further comprising:
    determining the queue depth from the global counter.

11. The method of claim 10, further comprising:
    accessing firmware to retrieve threshold values for the logical volume;
    determining if the queue depth is less than or equal to a queue depth threshold from the firmware;
    directing the storage controller to use the alternative data path for RAID type 0;
    directing the storage controller to use write back mode for RAID type 5; otherwise
    directing the storage controller to use the first data path for RAID type 0; and
    directing the storage controller use the write through mode for RAID type 5.

12. The method of claim 11, further comprising:
    when the storage controller is using the alternative data path for RAID type 0 and when a node is not present, using hash bucket logic to allocate a node and a respective local counter for managing cached data.

13. The method of claim 12, further comprising:
    when the host is functioning under an operating system that inserts a node pointer in the write command, decrementing the local counter; and
    when the local counter is equal to zero, setting a flag to indicate that the node is free and decrementing the global counter.

14. The method of claim 12, further comprising:
    when the host is functioning under an operating system that does not insert a node pointer in the write command, decrementing the local counter;
    when the local counter is equal to zero, updating a bitmap for the respective node;
    scheduling a deferred procedure call to identify from the bitmap when the node should be updated as free; and
    decrementing the global counter.

15. The method of claim 12, further comprising:
    when the host is functioning under an operating system with sequential logic detection, disabling the sequential logic detection in the operating system.

16. The method of claim 1, further comprising:
    defining a data structure for analyzing a stream of write commands;
    associating a respective value with a first stream threshold, a second stream threshold, and a third stream threshold;
    identifying when the stream of write commands includes a sequence where each write operation in the sequence includes N bytes, where N is greater than the first stream threshold and where the sequence of write commands includes M write commands, where M is greater than the second stream threshold, and
    when this is the case, directing the storage controller to bypass a cache.

17. The method of claim 16, further comprising:
    identifying when the stream of write commands includes a series of non-sequential write requests, where when the series includes P non-sequential write requests, where P is an integer less than the third stream threshold, and
    when this is the case, continuing to bypass the cache.

18. A system, comprising:
    a host computer that functions in accordance with logic enabled by an operating system and at least one executing user application, the operating system arranged to identify a logical volume to the at least one executing user application, the logical volume under control of a device driver;
    a host bus adapter coupled to the host computer and having a data storage controller and a local cache, the data storage controller arranged to function in accordance with a device driver executing on the host computer, the device driver arranged to dynamically configure the data storage controller to operate in one of a write-back mode or a write-through mode; and
    a data store supported by a set of flash-based storage devices exposed to the host computer as a redundant array of inexpensive disks (RAID) communicatively coupled to the host computer through the host bus adapter, wherein the device driver is arranged to:
    identify a RAID type for the logical volume;

identify a characteristic of the set of flash-based storage devices;

receive an alignment flag and a threshold type;

monitor a stream of write commands issued by the host computer to determine a queue depth, whether target addresses identified in the stream of write commands are sequential, and when the alignment flag is set, whether the data identified in the stream of write commands to be written is in alignment based on the characteristic of the set of flash-based storage devices;

when the logical volume is configured in RAID type 0, use the queue depth to direct the storage controller to use one of a first data path or an alternative data path different from the first data path in the data storage controller; and when the logical volume is configured in RAID type 5, use the queue depth to direct the storage controller to use a write back mode or a write through mode.

19. The system of claim 18, wherein the device driver includes an I/O command stream analyzer module arranged to:

identify when the I/O command stream includes a series of sequential write commands, where each write operation in the sequence includes N bytes, where N is greater than a first stream threshold and where the sequence of write commands includes M write commands, where M is greater than a second stream threshold, and when this is the case, the I/O command stream analyzer module directs the storage controller to bypass a cache;

identify when the I/O command stream includes a series of non-sequential write commands, where when the series includes P non-sequential write requests, where P is an integer less than a third stream threshold, and when this is the case, the I/O command stream analyzer directs the storage controller to continue to bypass the cache.

20. A computer-readable medium having stored thereon in computer executable non-transitory form instructions that, when executed on a processing system of a host computer, direct the host computer to:

identify a RAID type for a logical volume managed by a storage controller;

identify a characteristic of a set of flash-based storage devices coupled to the storage controller;

initialize a storage controller driver with an alignment flag and a threshold type;

monitor a stream of write commands to determine a queue depth, whether target addresses identified in the stream of write commands are sequential, and when the alignment flag is set whether data identified in the stream of write commands to be written is in alignment based on the characteristic of the set of flash-based storage devices;

for a logical volume supported by RAID type 0, use the queue depth to direct the storage controller to use one of a first data path or an alternative data path different from the first data path in the data storage controller; and for a logical volume supported by RAID type 5, use queue depth to direct the storage controller to use a write back mode or a write through mode.

\* \* \* \* \*